United States Patent
Ito et al.

[11] Patent Number: 5,782,217
[45] Date of Patent: Jul. 21, 1998

[54] PISTON FOR TWO CYCLE ENGINE

[75] Inventors: Eiichi Ito; Akihiko Okubo, both of Iwata, Japan

[73] Assignee: Yamaha Hatsudoki Kabushiki Kaisha, Iwata, Japan

[21] Appl. No.: 681,074

[22] Filed: Jul. 22, 1996

Related U.S. Application Data

[63] Continuation of Ser. No. 317,671, Oct. 5, 1994, abandoned.

[30] Foreign Application Priority Data

Oct. 12, 1993 [JP] Japan ................................. 5-280230

[51] Int. Cl.$^6$ ........................................................ F02F 5/00
[52] U.S. Cl. ........................................................ 123/193.6
[58] Field of Search ........................ 123/193.6, 668, 123/669, 305, 294; 92/222, 223; 277/136, 137, 216, 218

[56] References Cited

U.S. PATENT DOCUMENTS

| | | | |
|---|---|---|---|
| 2,300,518 | 11/1942 | Phillips | 277/136 |
| 2,980,088 | 4/1961 | Hines | 277/136 |
| 3,149,409 | 9/1964 | Maruhn | 123/193.6 |
| 4,075,934 | 2/1978 | Wacker | 92/223 |
| 4,708,104 | 11/1987 | Day et al. | 123/193.6 |
| 4,899,702 | 2/1990 | Sasaki et al. | 92/222 |
| 4,934,350 | 6/1990 | Lassanske | 123/193.6 |
| 4,941,397 | 7/1990 | Kawai et al. | 123/193.6 |
| 5,014,604 | 5/1991 | Santi | 123/193.6 |
| 5,050,551 | 9/1991 | Morikawa | 123/305 |
| 5,063,894 | 11/1991 | Mielke et al. | 123/193.6 |
| 5,158,052 | 10/1992 | Yoshimura | 92/223 |
| 5,261,362 | 11/1993 | Regueiro | 123/193.6 |
| 5,303,683 | 4/1994 | Wittwer et al. | 123/193.6 |

FOREIGN PATENT DOCUMENTS

| | | | |
|---|---|---|---|
| 0343300 | 11/1989 | European Pat. Off. | |
| 0454101 | 1/1991 | European Pat. Off. | |
| 2438548 | 2/1976 | Germany | 123/193.6 |
| 0138350 | 8/1978 | Germany | 92/223 |
| 8700575 | 1/1987 | WIPO | |

OTHER PUBLICATIONS

Patent Abstracts of Japan, vol. 11, No. 10 (M-552) (2457) 10 Jan. 1987 & JP-A-61 187 563 (Yamaha) 21 Aug. 1986.

*Primary Examiner*—Marguerite McMahon
*Attorney, Agent, or Firm*—Knobbe, Martens, Olson & Bear LLP

[57] ABSTRACT

A water-cooled, two-stroke crankcase compression internal combustion engine for powering a motor vehicle. The engine includes a piston, piston rings, and cylinder bore arrangement that are constructed to inhibit piston ring sticking by cooling the piston ring gaps by holding them against rotation and spraying fuel from a fuel injector toward the gap for cooling it. In addition, overheating of the small end of the connecting rod is inhibited by surface treating portions of the piston to render them harder and less heat conductive. Scuffing of the piston, piston rings, and cylinder bore are reduced by surface treating the area of the head of the piston around the ring grooves so as to trap and retain lubricant.

24 Claims, 28 Drawing Sheets

PISTON FOR TWO CYCLE ENGINE

This application is a continuation of U.S. patent application Ser. No. 08/317,671, filed Oct. 5, 1994 now abandoned.

BACKGROUND OF THE INVENTION

This invention relates to a piston and piston ring arrangement for a two-cycle internal combustion engine.

As is well known, the pistons of internal combustion engines are subject to considerable thermal stress which can cause a number of problems. Although some of these problems are experienced in all types of engines, certain problems are also encountered that are more problematical in two-cycle engines.

One type of problem which can be experienced in all engines but in some instances may be more likely in two-cycle engines is a condition called "piston ring sticking." As is well known, the seal between the piston and the cylinder is normally accomplished by one or more piston rings that are received in grooves formed in the head of the piston. The head of the piston is, of course, the most highly heated part, and thus heat transfer to the piston rings can present problems.

The piston rings are normally split so that they can be installed into the ring groove through expansion. The ring is then compressed when the piston and assembled rings are placed into the cylinder bore. In normal engine running, there is a small gap between the split ends of the piston rings. The facing ends of the piston ring adjacent the gap will become heated during normal engine operation to an extent that is greater than the remainder of the ring. Thus, lubricant which may be present within the gaps can carbonize or solidify. The buildup of such lubricant in the gap can eventually close the gap and cause the piston ring sticking condition.

It is, therefore, a principal object of this invention to provide an improved piston and ring construction for an internal combustion engine wherein piston ring sticking can be avoided or minimized.

It is a further object of this invention to provide an improved piston and piston ring construction wherein the gap between the split ends of the piston ring will be cooled.

The piston is normally connected to the small end of a connecting rod by means of a piston pin. The piston pin extends through piston pin bosses formed in the piston. These bosses are normally positioned below the head of the piston and at least in substantial part inwardly from the skirt of the piston. Therefore, by their very location, the piston pin bosses can become highly heated, and this heat is transmitted through the piston pin to the small end of the connecting rod. This gives rise to obvious heat problems and the possibility of deterioration of the lubricant in the small end of the connecting rod and potential damage.

It is, therefore, a still further object of this invention to provide an improved piston construction for an internal combustion engine wherein the heating of the piston pin bosses is substantially reduced.

It is a further object of this invention to provide an improved piston for an internal combustion engine wherein heat transfer to the piston pin bosses is reduced.

As has been noted, it is the normal practice to form a piston for an internal combustion engine with a plurality of ring grooves in which piston rings are received. Normally the uppermost groove or grooves receive piston rings that serve as compression seals. Lower grooves may receive oil scraper rings for controlling the amount of lubricant on the cylinder wall surfaces and for spreading the lubricant over the piston and piston rings for their lubrication.

The nature of the piston rings and the cooperation with the cylinder bore tends to cause the area below the top compression ring to receive little lubricant. Because of this, the compression ring may not be cooled adequately, nor may this area be adequately lubricated.

It is, therefore, a still further object of this invention to provide an improved arrangement for a piston and piston ring wherein the area around the uppermost piston rings is textured so as to entrap and hold lubricant.

SUMMARY OF THE INVENTION

A first feature of this invention is adapted to be embodied in an internal combustion engine that comprises a cylinder defining a cylinder bore. A piston is reciprocally received in the cylinder bore and is formed with at least one piston ring groove. A split piston ring is received in the ring groove and defines a gap at the adjacent ends of the piston ring. Means are provided for fixing the piston ring in the ring groove for limiting relative rotation therebetween. A fuel injector is provided for spraying fuel directly into the cylinder bore in a direction toward the piston ring gap for cooling the adjacent ends of the piston ring.

Another feature of the invention is adapted to be embodied in a piston for an internal combustion engine which is comprised of a head portion forming at least in part a combustion chamber. A skirt portion extends below the head portion and is adapted to slidably engage an associated cylinder wall. A piston pin boss is formed in the piston below the head portion and at least in part inwardly of the skirt portion for connection by a piston pin to the small end of a connecting rod. At least the head portion of the piston is surface treated for increasing its hardness and reducing its heat conductivity for protecting the piston pin boss from excessive heating.

Another feature of the invention is adapted to be embodied in a piston for an internal combustion engine and which has a head portion that is adapted to form in part a combustion chamber. A skirt portion is formed below the head portion for sliding engagement with a cylinder bore. A piston pin boss is formed below the head portion and at least in part inwardly of the skirt portion for receiving a piston pin for connecting to a small end of a connecting rod. At least one ring groove is formed in the head portion for receiving a piston ring. A roughened surface is formed adjacent the ring groove for accumulating and retaining lubricant in the area of the ring groove.

DETAILED DESCRIPTION OF THE PREFERRED EMBODIMENT OF THE INVENTION

The Basic Engine Construction (FIGS. 1–17)

Figure 1:
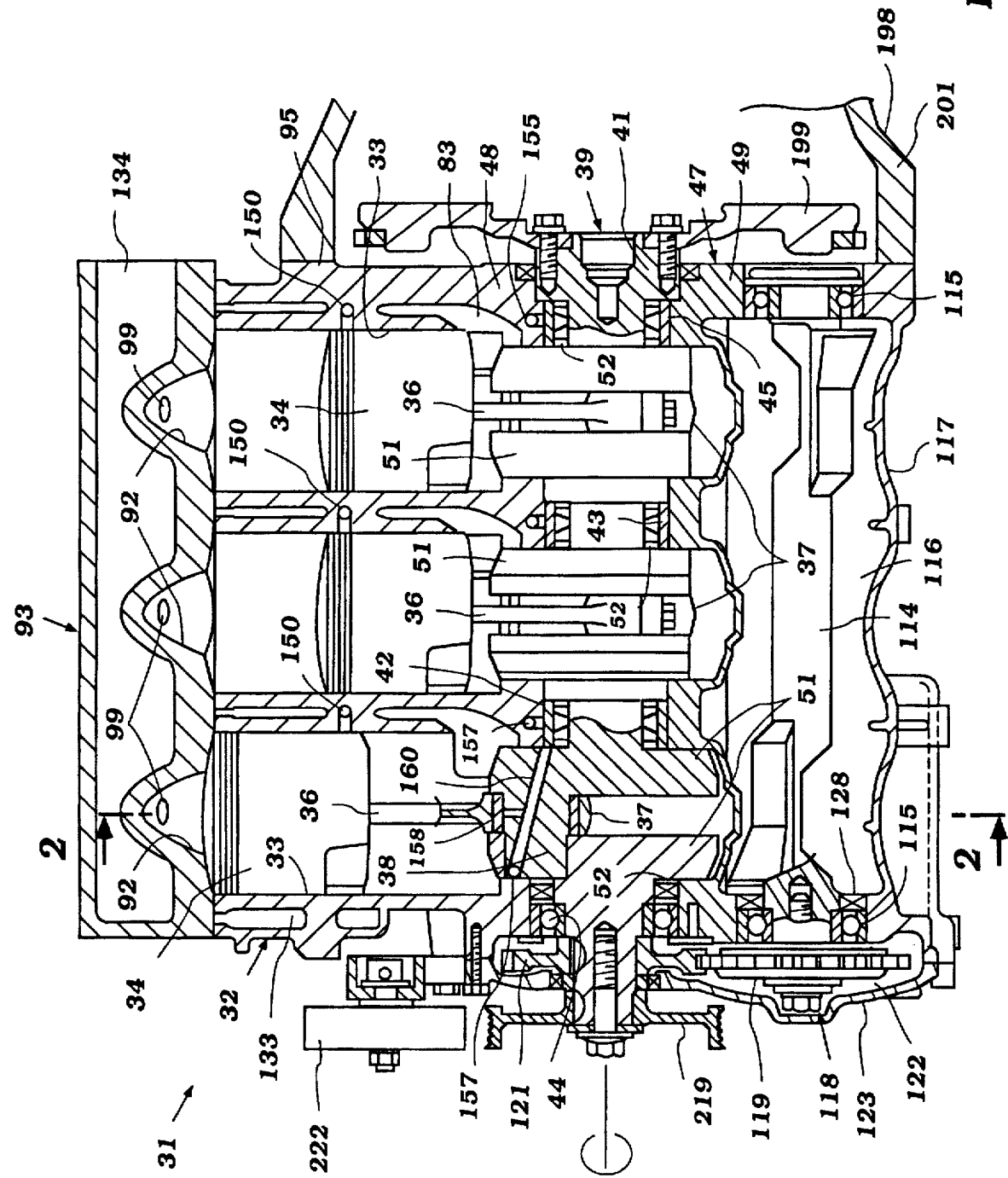
FIG. 1 is a longitudinal, cross-sectional view showing an internal combustion engine constructed in accordance with a preferred embodiment of the invention.
Figure 2:
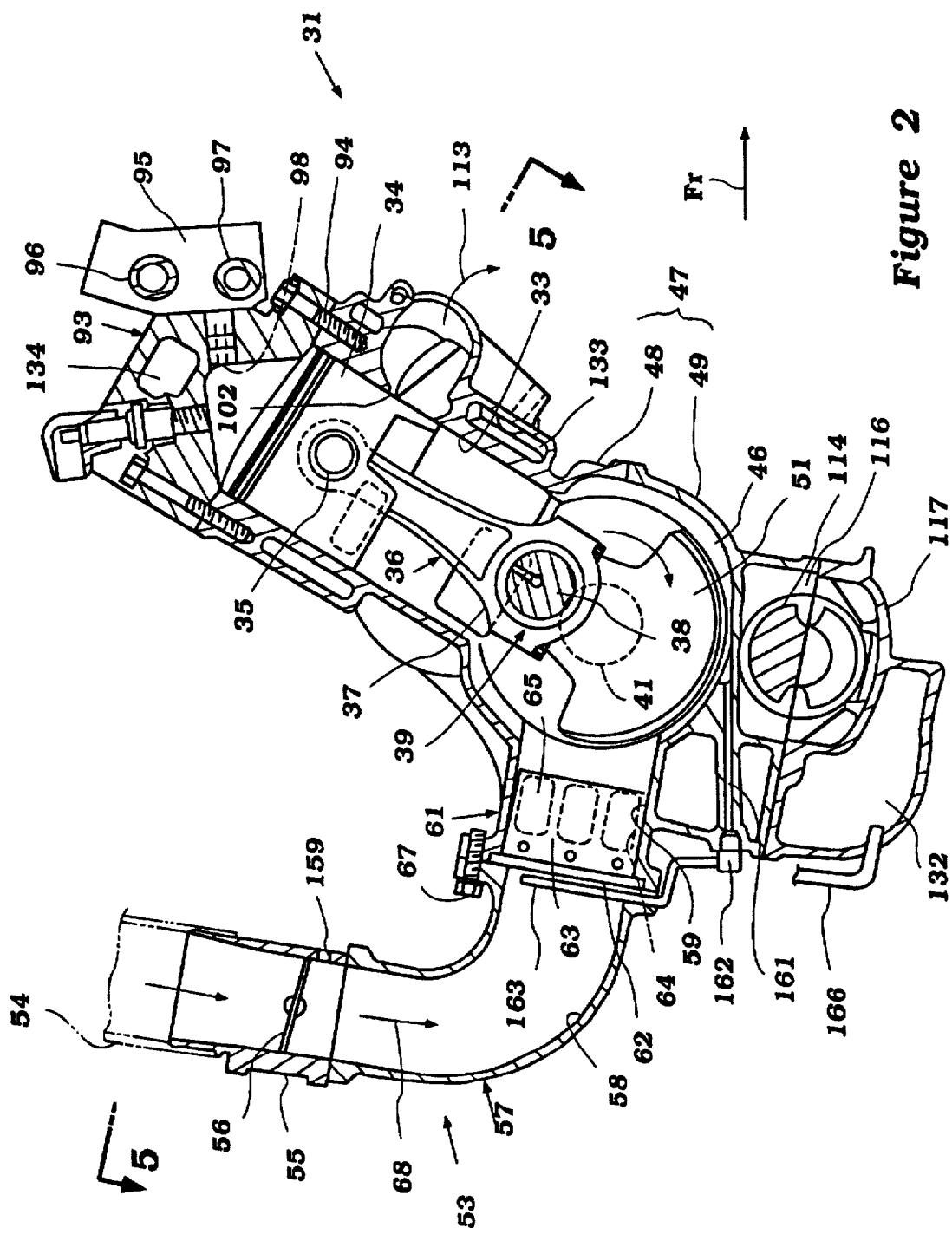
FIG. 2 is a cross-sectional view of the engine taken along the line 2—2 of FIG. 1.
Figure 3:
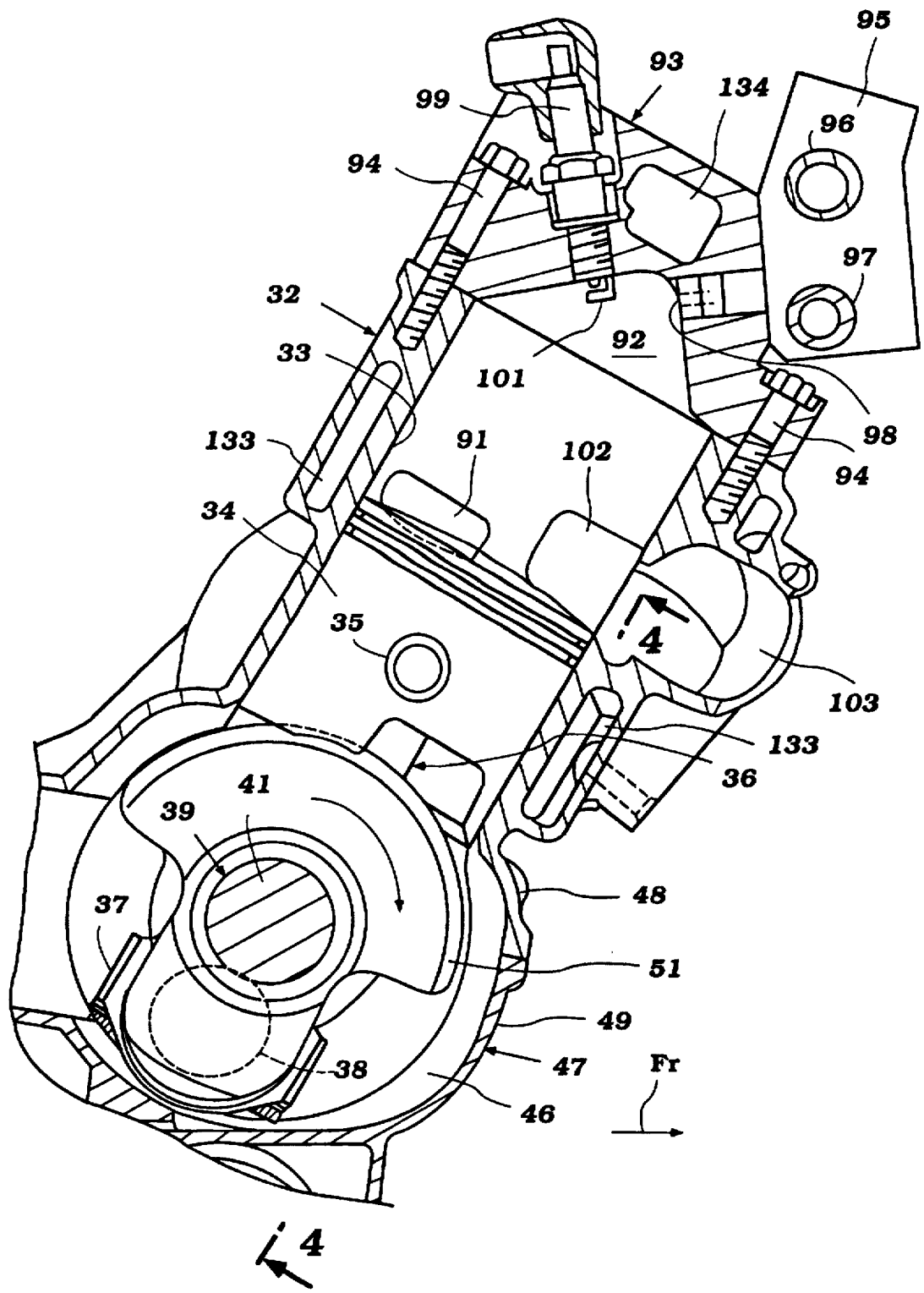
FIG. 3 is a further enlarged cross-sectional view taken along the same plane as FIG. 2.
Figure 4:
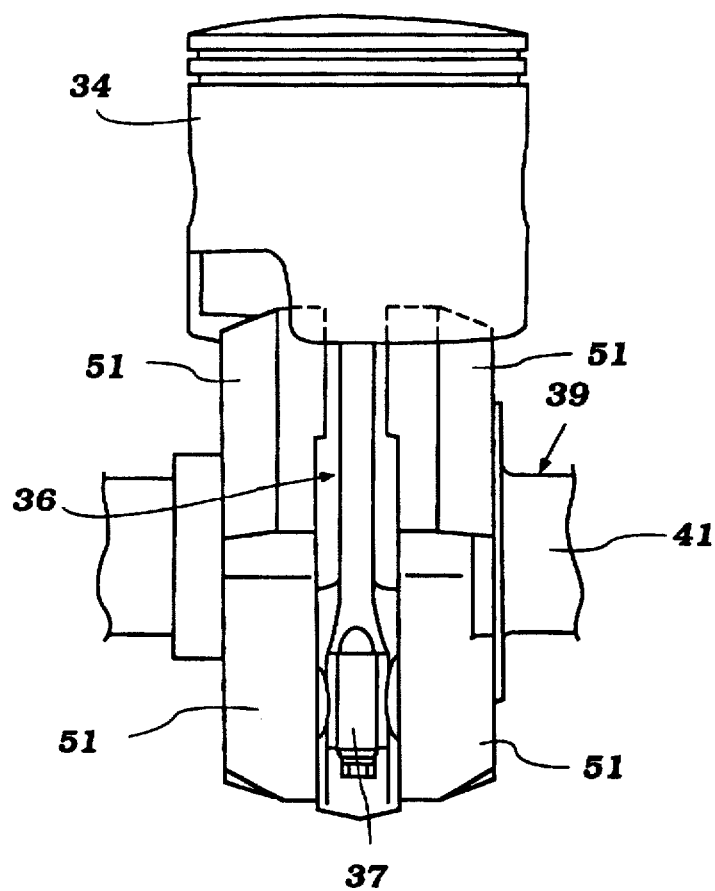
FIG. 4 is a side elevational view of the piston and connecting rod and looks generally in a direction of the arrows 4 in FIG. 3.

Referring initially primarily to FIGS. 1–3, a two-stroke, crankcase compression, internal combustion engine constructed in accordance with an embodiment of the invention is indicated generally by the reference numeral 31. The engine 31 and its supporting components, as will be described, is laid out in such a way so as to facilitate its utilization in powering a motor vehicle, which will be described later by particular reference to FIGS. 18–25 and in which the engine 31 is positioned transversely in a forwardly positioned engine compartment of the vehicle for driving the front wheels thereof.

The engine 31 has a cylinder block assembly 32 that is provided with three cylinders bores 33 which, in the illustrated embodiment, are inclined slightly from a vertical plane in a forward direction when installed in a vehicle. Although the invention is described in conjunction with three cylinder engines having such an orientation, it will also be apparent to those skilled in the art how the invention can be applied to engines having other numbers of cylinders and other orientation of these cylinders such as V-type, opposed, etc.

Pistons 34 are slidably supported within each of the cylinder bores 33 and are connected by means of piston pins 35 to the upper or small ends of respective connecting rods, indicated generally by the reference numeral 36. The lower or big ends 37 of the connecting rods 36 are journaled on the individual throws 38 of a crankshaft, indicated generally by the reference numeral 39. The crankshaft 39 has main bearings 41 that are journaled within intermediate main bearings 42 and 43 and end main bearings 44 and 45.

The crankshaft 39 rotates in a crankcase chamber 46 of a crankcase assembly 47 which is formed by a skirt 48 of the cylinder block 32 and a crankcase member 49 that is detachably connected thereto in a well known manner. The throws 38 have counterweight portions 51 and the configuration of the crankcase chamber 46 is such as to maintain as small a clearance volume as possible, as is desirable with two-cycle engine practice. As is also typical with two cycle engine practice, the areas of the crankcase chamber 46 associated with each of the cylinder bores 33 are sealed from each other by seals 52 that are disposed between the respective main bearings 42, 43, 44 and 45 as is well known in this art.

An intake charge is delivered to the individual crankcase chambers 46 by an induction system, indicated generally by the reference numeral 53 and shown in most detail in FIG. 2. This induction system 53 also appears in FIGS. 5 and 10 partially in the latter case. The induction system 53 receives air from a vehicle air inlet silencer and cleaner (to be described later by reference to FIGS. 18–25) through a duct 54 shown in phantom in FIG. 2.

The duct 54 communicates with a throttle body 55 in which a single manually positioned throttle valve 56 is positioned for controlling the speed of the engine 31 in a well-known manner. The throttle valve 56 is controlled through a suitable linkage system (not shown).

The throttle body 55 communicates with an inlet opening of an intake manifold indicated generally by the reference numeral 57 and having individual runners 58 each of which terminates at a respective intake port 59 formed in the crankcase 47 in communication with the respective crankcase chamber 46. Positioned in each intake port 59 is a reed-type check valve assembly 61 comprised of a caging member 62 that has a V-shaped configuration and which defines a recess 63 between its angularly disposed sides. These sides have openings 64 with the flow through these openings being controlled by reed type valve elements 65 that are fixed to the caging member 62 in a well known manner. Threaded fasteners 66 maintain the manifold 57 to the crankcase assembly 47 with the reed type valve caging member 62 being sandwiched therebetween.

As the pistons 34 move upwardly in the cylinder bores 33 they will cause a pressure drop in the respective crankcase chambers 46 causing air to flow through the induction system 53 in the direction indicated by the broken arrows 68 in certain of the figures. This air then enters the crankcase chambers 46 through the opening of the reed valve assemblies 61.

As the pistons 34 move downwardly this charge will be compressed and then forced through scavenge passages 89 (FIG. 7) formed around the circumference of each of the cylinder bores 33 in the cylinder block 32. This charge will then enter the cylinder bores 33 through scavenge ports 91 formed circumferentially around the cylinder bores 33.

Referring now again primarily to FIGS. 1-3, this charge exiting the scavenge ports 91 enters a combustion chamber that is formed by the cylinder bore 33 above the heads of the pistons 34 and combustion chamber recesses 92 formed in a cylinder head assembly, indicated generally by the reference numeral 93, that is affixed to the cylinder block 32 by fasteners 94. This charge is further compressed as the pistons 34 move upwardly in the cylinder bores 33.

The engine 31 is supplied with fuel by direct cylinder injection via air/fuel injectors, indicated generally by the reference numeral 95. In the illustrated embodiment, the injectors are air/fuel injectors and receive fuel, from a system to be described when the vehicle is described by reference to FIGS. 18-25 from a fuel conduit 96 and compressed air from an air supply system, also to be described by reference to the vehicle, including a supply conduit 97. The air/fuel injectors 95 are mounted in the cylinder head 93 and have nozzle portions 98 which are disposed so as to inject fuel and compressed air into the cylinder head recesses 92. Any form of known air/fuel injector may employed as the injectors 95.

Alternatively, only fuel may be injected into the combustion chambers 92 by the injectors 95. The injectors 95 inject the fuel in a particular direction relative to the pistons 34 for a reason which will be described later by particular reference to FIG. 12. In the illustrated embodiment, the engine is spark ignited although it should be readily apparent to those skilled in the art that the invention may also be employed in conjunction with diesel engines.

The combustible charge delivered to the combustion chambers, including the cylinder head recesses 92, is fired by means of spark plugs 99 that are affixed to the cylinder head 93 and have their gaps 101 extending into the cylinder head recesses 92. The spark plugs 99 are fired by any suitable ignition system.

The ignited charge will burn and expand to drive the pistons 34 downwardly and drive the crankshaft 39. Eventually, the downward movement of the pistons will open exhaust ports 102 for discharge through an exhaust system which will now be described by particular reference to FIGS. 2, 3, and 5-8. This exhaust system includes exhaust passages 103 that extend through the cylinder block 32 on the side opposite the scavenge passages 91 so that the scavenging charge will cause a Schnurl type of scavenging in the combustion chamber.

Exhaust control valves, indicated generally by the reference numeral 104, are mounted in the sides of the exhaust passages 103 adjacent the exhaust ports 102. These exhaust valves 104 are mounted in bores 105 that extend transversely to the cylinder bores 33 and contain rotary valve elements that have a cutout portion 106 which when rotated will obscure a portion of the upper part of the exhaust ports 102 so as to in effect delay the opening of the exhaust ports on downward movement of the piston and advance the closing of the exhaust ports 102 on the upward movement of the piston so as to in effect increase the effective compression ratio of the engine. Any desired type of strategy can be employed for so positioning the exhaust valve elements 106 and controlling the compression ratio to achieve the desired result.

Figure 8:
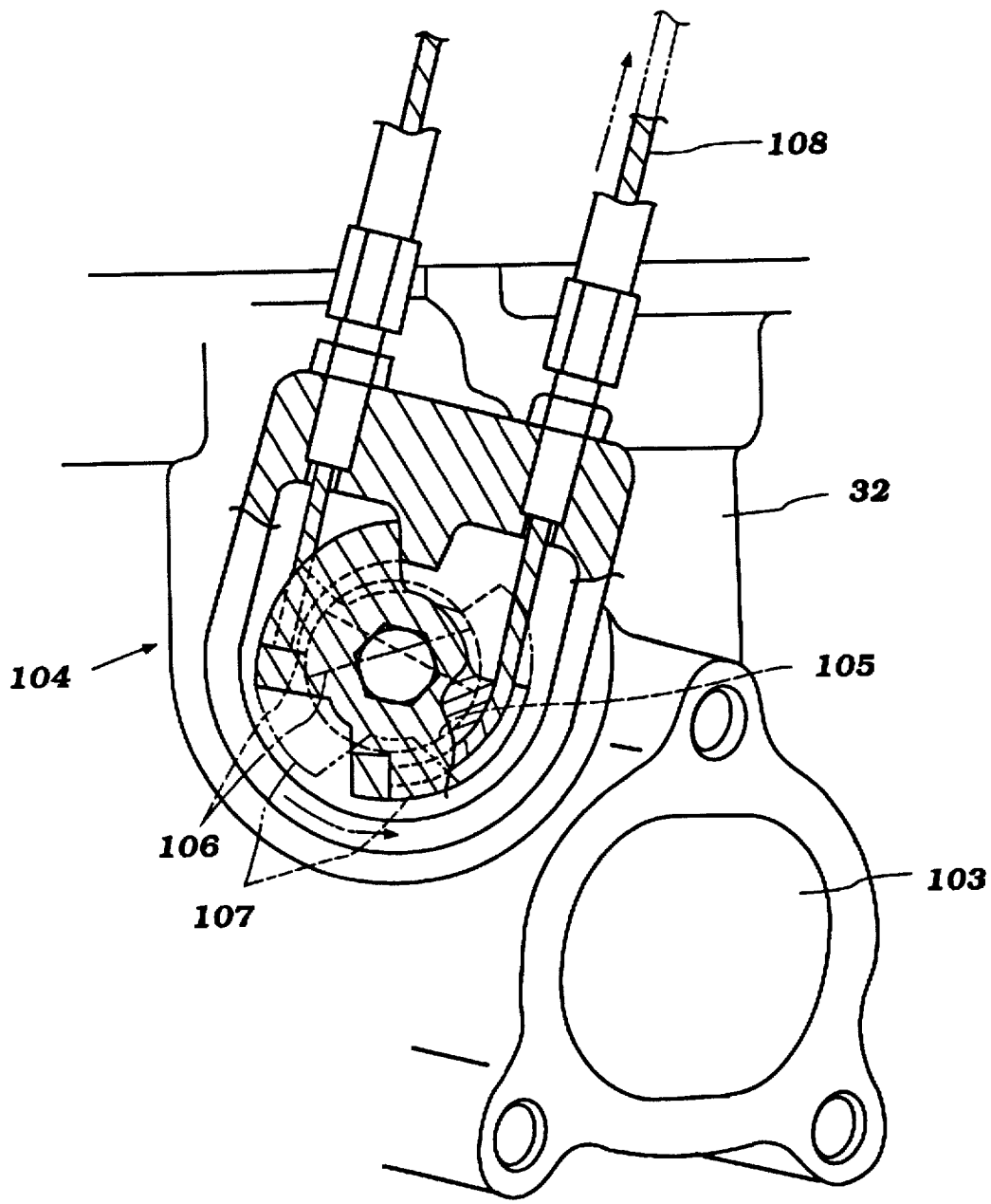
FIG. 8 is a cross-sectional view taken generally along the line 8—8 of FIG. 5 and shows the actuating mechanism for one of the exhaust control valves in more detail.

Referring specifically to FIG. 8, the exhaust control valve elements 106 have end portions to which a pulley 107 is affixed. A wire transmitter 108 is connected to this pulley and is connected at its opposite end to a servomotor (not shown) that is operated by any known type of control strategy for appropriately varying the compression ratio. The compression ratio may be lowered at high speed, high load conditions and maintain higher at low speed, low load conditions in order to minimize thermal loading on the engine in one form of strategy.

An exhaust system including an exhaust manifold, indicated generally by the reference numeral 109, is attached to the cylinder block 32 and communicates with an exhaust system for discharging exhaust gases to the atmosphere which exhaust system will be described later by reference to FIGS. 18-24.

The exhaust manifold 109 includes individual runner sections 111 each extending from a respective one of the exhaust passages 103 and terminating in a downwardly facing common collector section 112. The exhaust gases flow in the direction of the arrow 113.

In order to promote smooth running and minimum vibrations generated from the engine 31, it is provided with a balancer shaft 114, the construction and operation of which may be best understood by reference to FIGS. 1, 2, 9, and 10. This balancer shaft 114 is rotatably journaled by means of a pair of spaced apart bearings 115 disposed in the front and rear walls of the crankcase forming number 82 and which is contained within a chamber 116 that is disposed adjacent but separated from the crankcase chamber 46 by an integral wall. The lower portion of this chamber 116 is enclosed by a lower wall 117.

Forwardly of the forwardmost bearing 115, a transmission assembly, indicated generally by the reference numeral 118, is provided for driving the balancer shaft 114 at the same speed but in an opposite direction to the crankshaft 39. This transmission 118 includes a first gear 119 that is affixed in a manner to be described to the outer end of the balancer shaft 114 and a second gear 121 which is affixed for rotation with the crankshaft 39. This transmission 118 is contained within a transmission cavity 122 formed in part by a front wall 123.

Figure 9:
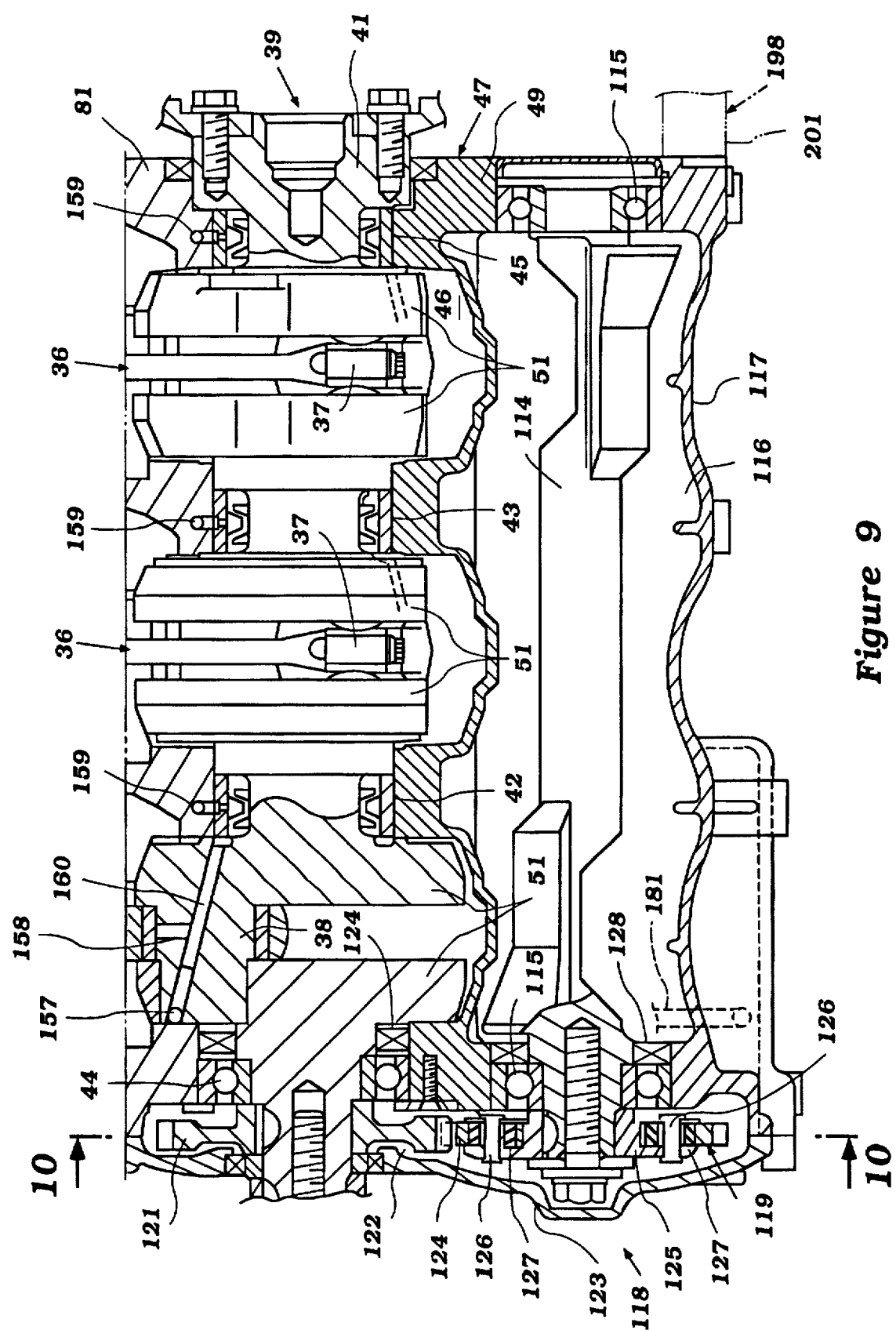
FIG. 9 is a further enlarged cross-sectional view of a portion of FIG. 1 showing the crankshaft and balance shaft and drive arrangement therebetween.
Figure 10:
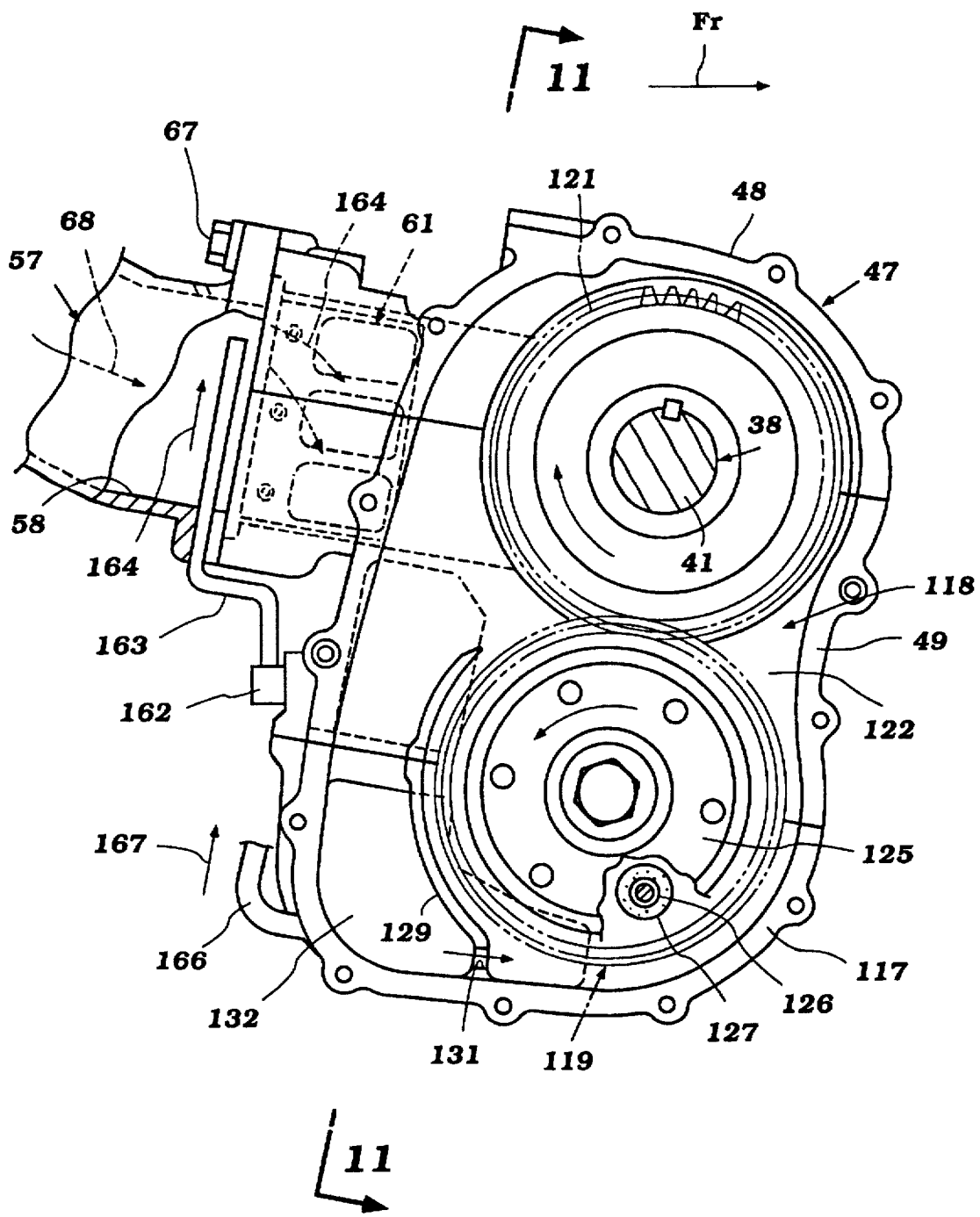
FIG. 10 is a cross-sectional view taken along the line 10—10 of FIG. 9 and shows the driving transmission arrangement for the balancer shaft with portions broken away.

As may be best seen in FIGS. 9 and 10, the gear 119 is affixed to the balancer shaft 114 by means of a flexible coupling so as to provide some torsional damping. Thus, the gear 119 includes an outer ring segment 124 that is connected to a hub portion 125 by means of a plurality of pins 126 and surrounding elastic dampers 127.

On the opposite side of the front bearing 115, the compartment 116 is sealed by means of an oil seal 128 for a reason which will become apparent.

The transmission cavity 122 is provided with an internal wall 129 (FIG. 10) in which a restricted opening 131 is provided. This forms a second cavity 132 to one side of the transmission 118. The right hand side of the wall 129 can be filled with lubricant to a level that will approach or even be higher than the axis of rotation of the balancer shaft 114 when the engine is not running. However, due to the rotation of the gear 119 as shown by the arrows in FIG. 10, the gear teeth 124 will pick up the lubricant and throw it over the wall 129 into the cavity portion 132 where it will accumulate when the engine is running. Thus, adequate lubrication for the transmission 118 is possible but drag is minimized since when the engine is running the lubricant will seep slowly back into the transmission cavity 122 through the restricted opening 131 and only the lower tips of the teeth of the gear 119 will be emersed.

The engine 31 is liquid cooled and thus both the cylinder block 32 and cylinder head 93 are provided with respective cooling jackets 133 and 134, respectively, which cooling jackets appear in FIGS. 1, 2, 3, 5, 6, 7, 12, and 26–28. Coolant is circulated through this cooling jacket in a manner which will be described when the vehicle is described by reference to FIGS. 18–24 and 26–28.

It has been noted that the fuel air injector 95 sprays the fuel into the engine combustion chambers in a particular direction relative to the orientation of the pistons 34. The reasons for this will now be described by reference to FIGS. 12–17.

Figure 12:
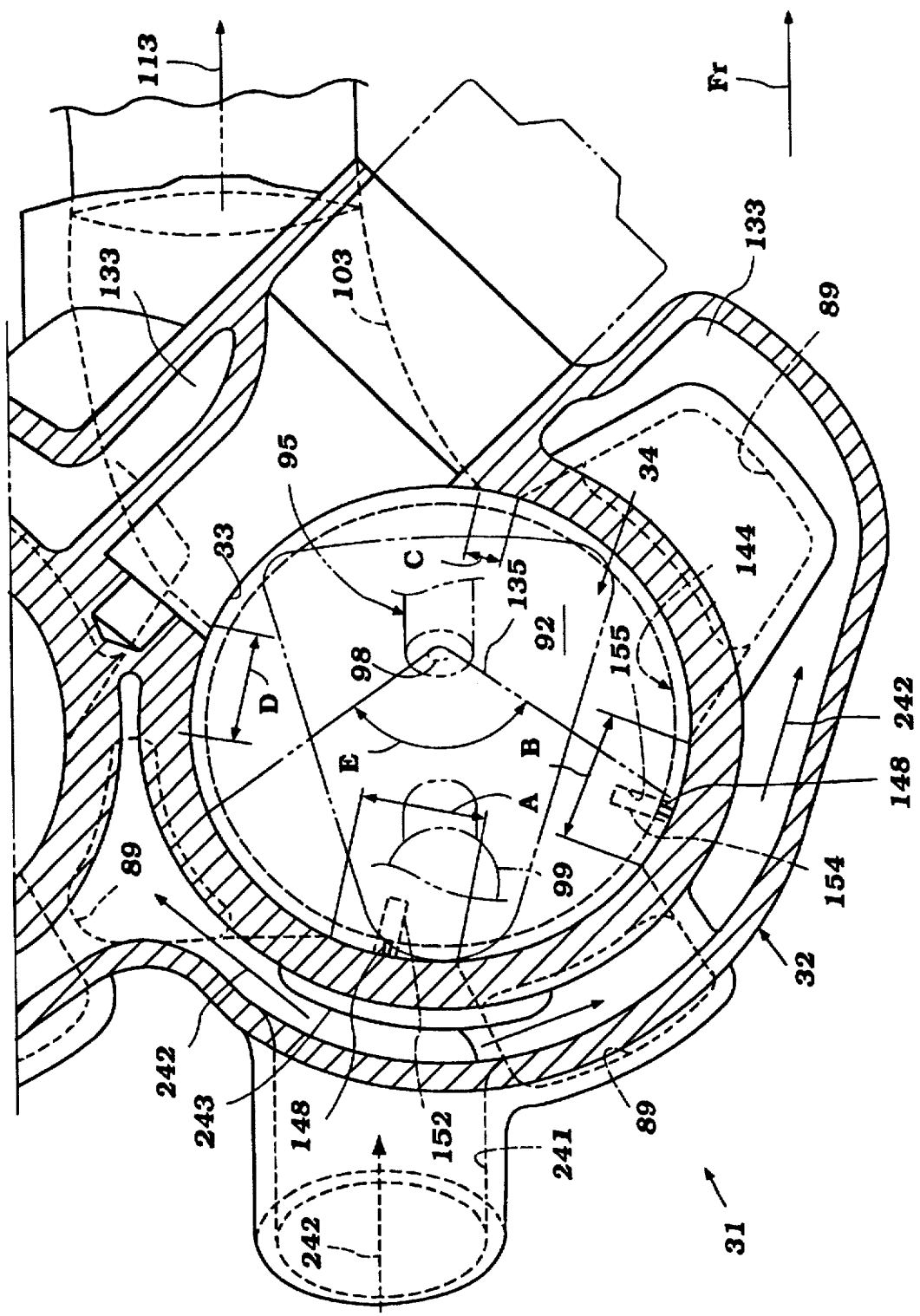
FIG. 12 is an enlarged partial cross-sectional view of the end cylinder and is taken along the same plane as FIG. 5.
Figure 13:
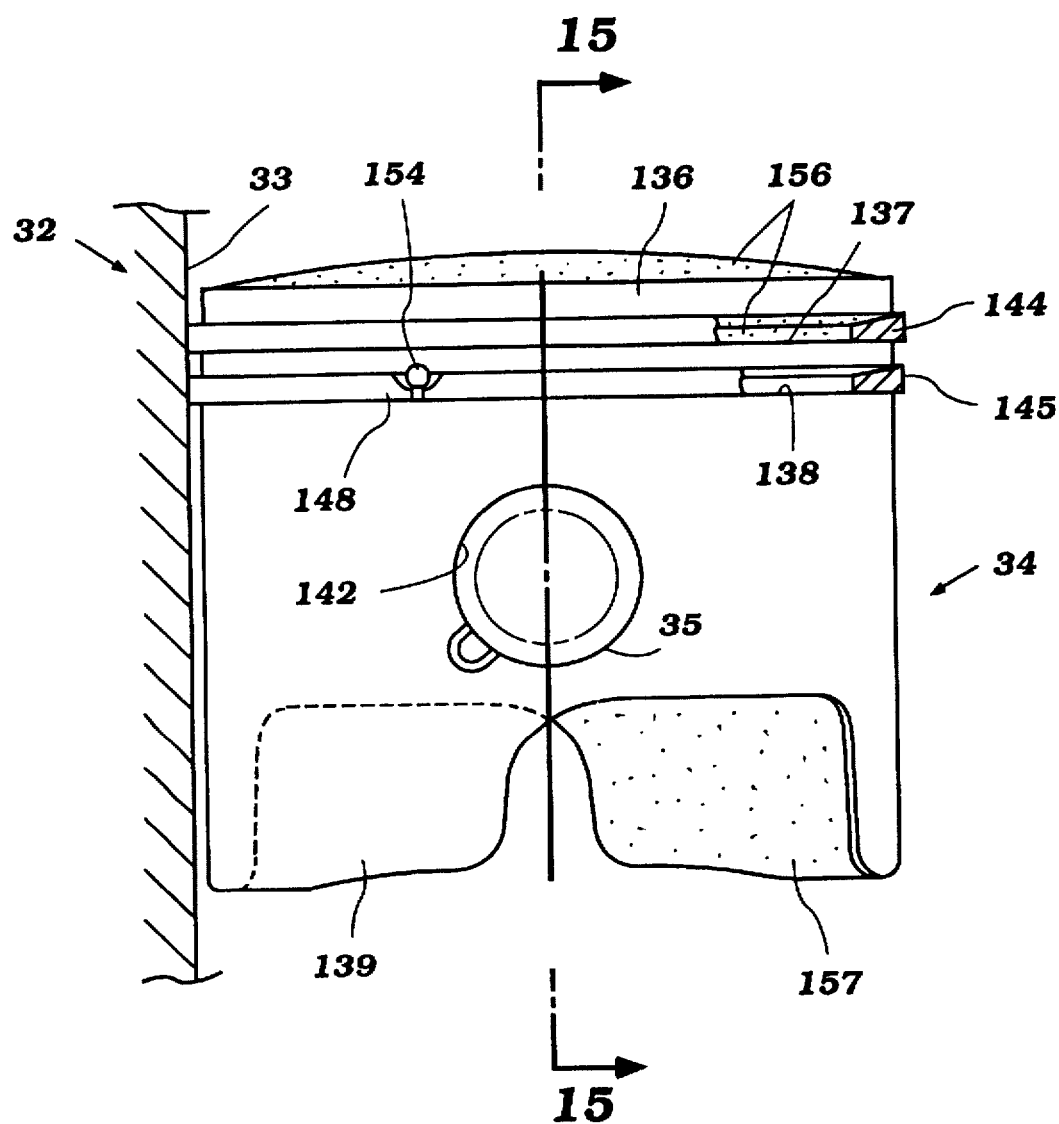
FIG. 13 is an enlarged cross-sectional view taken along the same plane as FIG. 2 and shows the relationship of the piston, piston rings, and cylinder wall.
Figure 14:
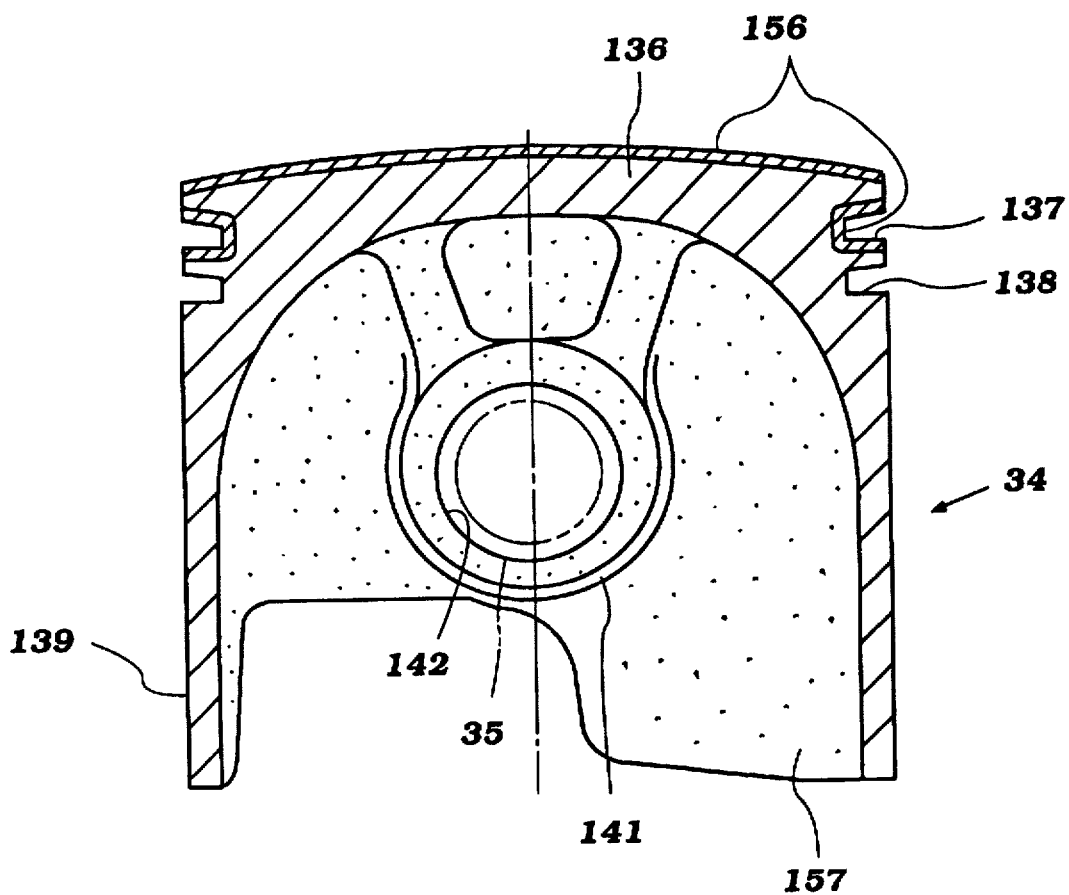
FIG. 14 is an enlarged cross-sectional view taken along a plane parallel to the plane of FIG. 13.
Figure 15:
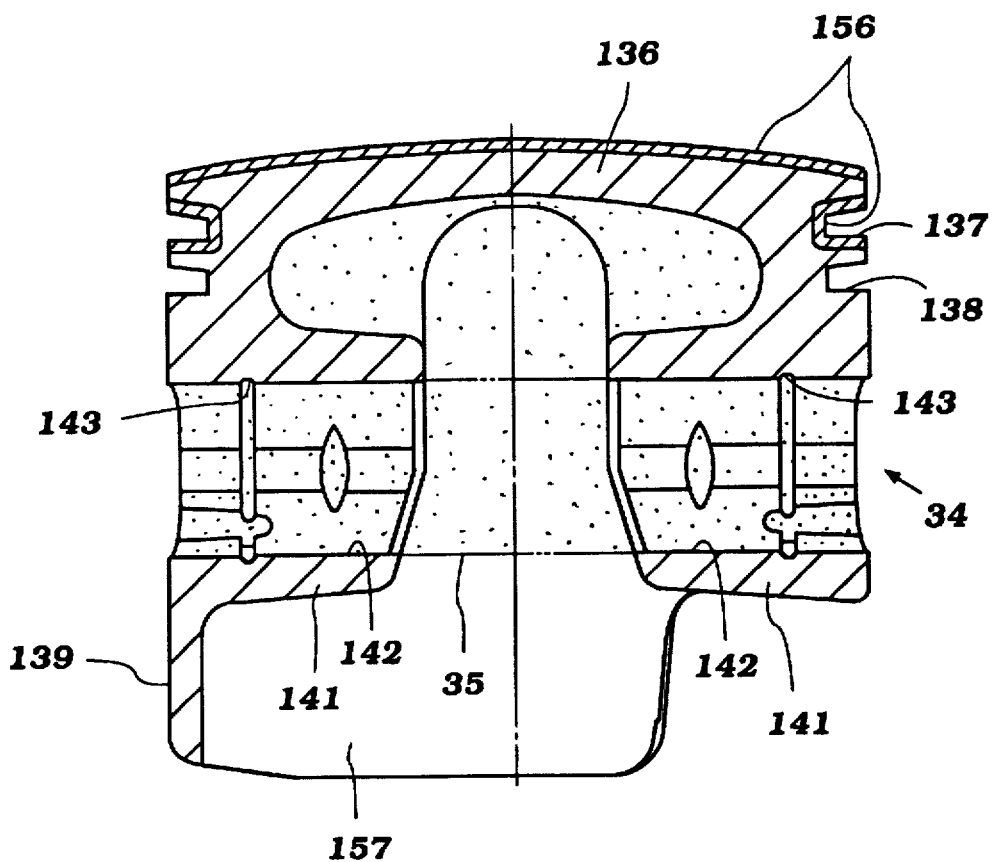
FIG. 15 is a cross-sectional view taken along the line 15—15 of FIG. 13.

Referring first to FIG. 12, this shows the spray pattern, indicated by the arc 135, having an angle E into the combustion chamber toward the cylinder bore 33. It should be noted that the fuel injector discharge nozzle 98 is positioned on one side of a longitudinal plane passing through the axes of the cylinder bores 33 and which is coincident with the axis of rotation of the crankshaft 39. The injector nozzle 98 has its spray 135 directed toward the opposite side of this plane. This is also toward the scavenge ports 89.

It should be noted that there is a gap indicated by the dimensions A and B between the respective scavenge ports 89. There is a further gap having the dimension D between the side scavenge port 89 and the exhaust port 103, and a gap C having a dimension between other side scavenge port 89 and the exhaust port 103. The significance of this will be apparent. Referring now primarily to FIGS. 13, 14, 16, and 17, it will be noted that each piston 34 is made up of a head portion 136 in which a pair of piston ring grooves 137 and 138 are formed. A skirt portion 139 depends from the head portion 136 and is adapted to have a sliding engagement with the cylinder bore 33, although there is a gap between this diameter and the cylinder bore. A pair of piston pin bosses 141 are formed integrally with the piston 134 below the head portion 136 and spaced primarily radially inwardly from the skirt 139. The piston pin bosses 141 are formed with through bores 142 in which the piston pins 35 are received. A pair of grooves 143 (FIG. 15) are formed in the piston pin bosses 141 so as to receive clips that hold the piston pin 35 in position.

Piston rings 144 and 145 are received within the piston ring grooves 137 and 138. Each piston ring 144 and 145 is formed at a split ring having facing end portions 146 and 147, respectively, as is well known in this art. The splitting of the ends 146 and 147 permits the rings 144 and 145 to be expanded over the piston head 136 and inserted into the grooves 137 and 138. The rings 144 and 145 are compressed upon insertion of the piston 34 into the cylinder bore 33, as is well known in this art. However, the ends 146 and 147 may become overly heated, and lubricant may thus be carbonized or solidified in the gap between the ends 146 and 147 and produce piston ring sticking. An arrangement is provided, which will now be described for precluding the likelihood of this happening.

In accordance with the invention, each piston ring 144 and 145 is locked against rotation in the respective groove 136 and 137. In addition, the piston rings 144 and 145 are locked so that the gap between their ends 146 and 147 is disposed in an area away from the scavenge ports 89 and exhaust port 103, i.e., in the areas A, B, C, or D. In addition and in accordance with a feature of the invention, the piston ring gaps are located also within the arc E of the spray 135 from the injection nozzle 98 so that fuel will be deposited on them and effect cooling. The way that this is accomplished will now be described by particular reference to FIG. 17, although the construction also appears in FIGS. 12, 13, and 16.

Each of the end portions 146 and 147 is provided with a relief, indicated generally by the reference numeral 148, which is comprised of portions 149 and 151 formed by the end portions 146 and 147, respectively. The piston 45, and specifically its head 136, is formed with a first bore 153 to receive a first pin 152 (FIG. 12) that is aligned with the area A and which is centered in the center of the fuel injection spray angle E. This is done in connection with the uppermost piston ring 144 so as to ensure that it will receive the greatest amount of fuel deposit when the injector 95 injects fuel. Since this ring is the highest, it is the most subject to heat.

In order that the gaps of the two piston rings will not be aligned, the lower piston ring 145 is retained in position by means of a pin 154 that is received in a further bore 155 in the piston head 136. This still lies within the injection spray path E, and thus some fuel will also cool the gap between the ends of the lower piston ring 145. In addition to providing cooling, any fuel that may also be deposited on the cylinder wall 33 and scraped by the piston ring will clean the gap between the ends 146 and 147.

In addition to the problem of piston ring sticking, there is also a danger that too much heat will be transferred from the head of the piston 136 to the piston pin bosses 141 and heat the small or big end of the connecting rod through heating of the piston pin 35. Therefore, the piston 34 is subjected to a localized surface texturing and coating that will increase its hardness and also decrease its heat conductivity. This treatment may be a hardening and lubricating alumide or other similar process, bearing in mind the fact that the pistons 34 are, as is typical, formed from aluminum or an aluminum alloy. These surface treating areas include an area, indicated by the reference numeral 156, that is formed on the piston head 136 and which extends down through the upper piston ring groove 137. In addition, the entire interior surface of the piston 34 is also so surface treated, as indicated at 157 as are the bore in the pin bosses 141. These areas are shaded in FIGS. 13–15 for clarity purposes.

Figure 16:
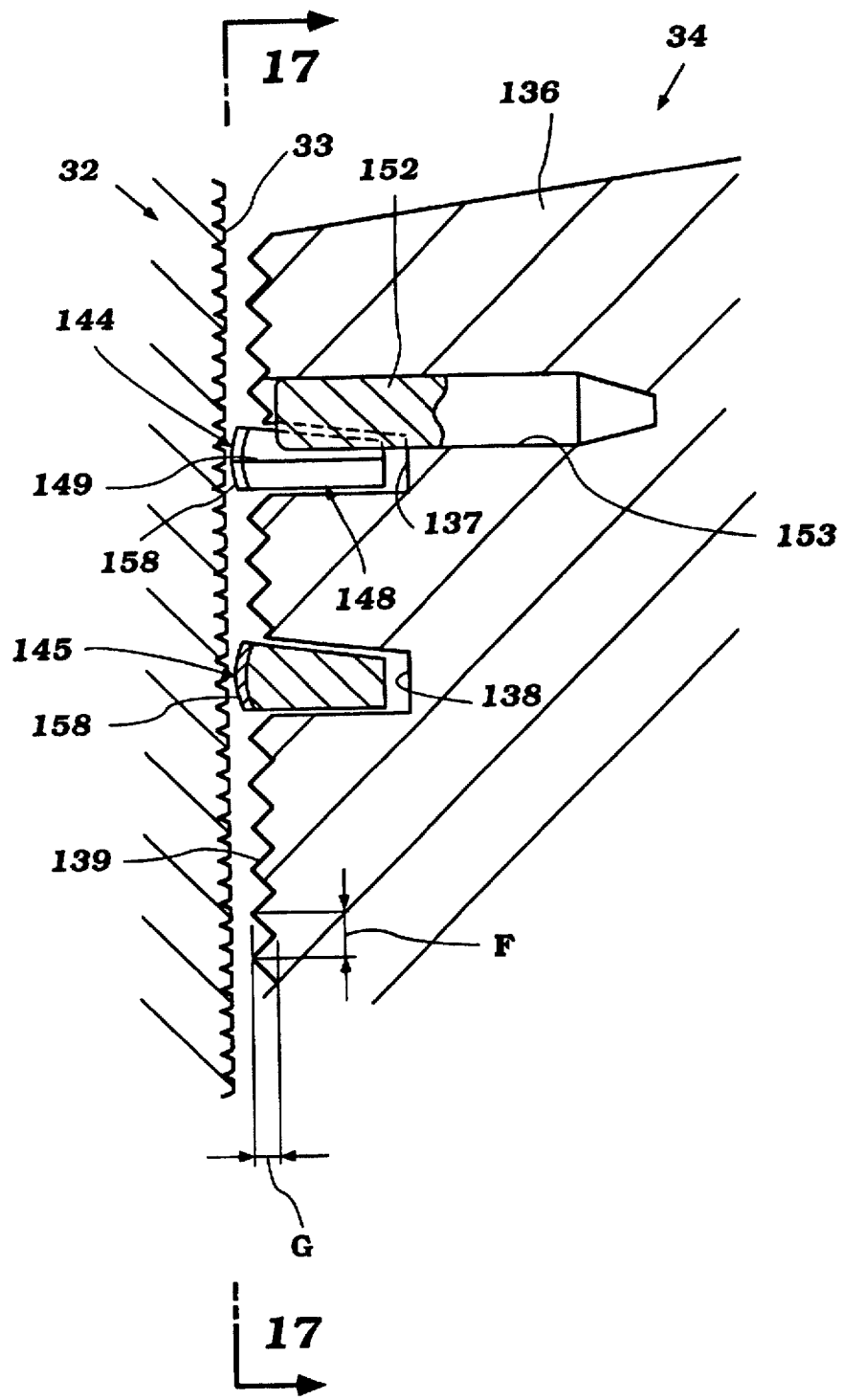
FIG. 16 is an enlarged cross-sectional view, taken in the same direction as FIG. 13 but shows the surface texturing and treatment in accordance with another embodiment of the invention.

A further feature of the piston and piston ring construction and associated cylinder bore 33 in accordance with the invention will be described by particular reference to FIGS. 16 and 17. It should be noted that the piston rings 144 and 145 are formed from cast iron, rather than stainless steel, and thus they have a higher heat conductivity than the prior art type of construction. A coating, indicated generally by the reference numeral 158, is applied to the exterior surface of the piston rings 144 and 145, and specifically to the surface that engages the cylinder bore 33. This coating is a CrN coat, as compared to the hard chromium plating used with the prior art. This provides very good wear properties for both the ring and the cylinder bore. This CrN coat is applied as a hard film and has a thickness of at least 50 μm or greater. Hence, the life expectancy and wear resistance is substantially increased.

As will be noted below in connection with the lubrication system, lubricant is delivered to the exterior surface of the piston 34 and primarily to its skirt area 139. This lubricant will be deposited on the cylinder bore 33 and will lubricate the rings 144 and 145. However, there is a danger that the uppermost ring 144 may not receive adequate lubricant, and therefore the upper area of the piston 34, specifically on the upper and lower sides of the ring groove 137, is subjected to a striation process, which leaves them with surfaces evidencing projections and depressions. The pitch F of the projections and depressions on the piston 34 is in the range of 0.15 to 0.3 mm, and the height G is in the range of 0.3 to 14 μm, with the centerline average roughness being 1.2 to 3.2 ra.

If desired, the wall of the cylinder block 32 which forms the cylinder bore 33 may also be formed with a surface roughness through a striation process. The pitch or distance F between the peak of the cylinder bore surface 33 is smaller than that of the piston and the depth G of these grooves is less than that of the piston. The cylinder bore surface 33 may also be plated by a thin film plating process with a CrN coating applied as a hard film. If this is done, the resulting distance between the grooves will be smaller but the depth of the grooves will be greater. The cylinder bore 33 is preferably plateau honed for surface finishing either if plated or not.

Figure 17:
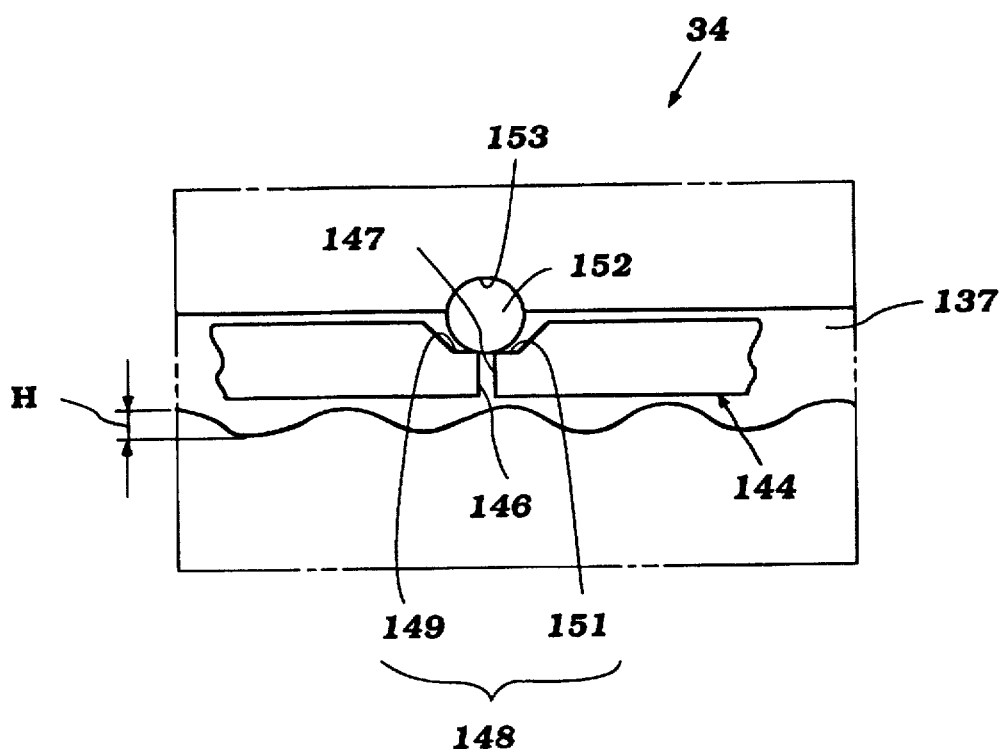
FIG. 17 is a view taken in the direction of the arrow 17—17 in FIG. 16 and shows the relationship of the top compression ring relative to its ring groove.

In addition and as is shown in FIG. 17, the lower surface of the upper piston ring groove 136 is roughened to a depth of 3 μm or less so as to ensure that the lubricant will be accumulated in these roughened surfaces and will well lubricate the upper end of the piston 34 and the piston rings 144 and 145.

The lubricating system for the engine 31 is shown only partially in the drawings, but the system is of the type as disclosed in the copending application entitled "Lubricating System for Engine," Ser. No. 08/287,660, filed Aug. 9, 1994, in the names of Akihiko Okubo and Takeshi Ito, which application is assigned to the assignee hereof. The disclosure of that application is incorporated herein by reference.

This lubricating system, as has been noted, includes an arrangement for delivering lubricant directly to the skirts of the pistons 34, and this includes a series of lubricant passages 150 (FIG. 1) that are formed in the cylinder block 32 and which have drillings that extend radially into the cylinder bores 33 at a point which is swept by the skirts 139 of the pistons 34 and at least a part of the head portion 136 in proximity to the ring grooves 137 and 138 when the pistons 34 are at their bottom dead center position.

The system for lubricating the crankshaft 38 will now be described by particular reference to FIGS. 1 and 9. The lower portion of the cylinder block 32 is provided with a further series of cross drilling 159 adjacent each of the main bearings 42, 43, and 45. Lubricant is delivered to these drillings 159 by a pump arrangement. Radially extending drilling intersect these cross drilling and deliver the lubricant directly to these main bearings.

In addition, the sides or throws 51 of the crankshaft 38 have cross drilling 160 which begin from adjacent from the respective bearings 42, 43 and 52 and pick up the lubricant which has lubricated these bearings. The cross drilling 160 are angularly disposed and are closed at their outer ends by plugs. The throw bearing portions 38 are provided with cross drilling so that lubricant will flow by centrifugal force to lubricate the throws and big ends of the connecting rods 36.

It should be noted that the front main bearing 44 and the bearing 155 for the balancer shaft 114 will be lubricated by splash of the lubricant contained within the cavity 122. Therefore, no separate lubricating system is required for these two bearings.

An indirect lubricating system is provided for the remaining components of the engine 31, as noted in the aforenoted copending application, a portion of which appears in FIG. 2. The lubricant from this lubricating system 137 is delivered to the induction system and particularly to the intake manifold 57. For that purpose, the manifold inlet upstream of the runners 58 is provided with a drilled passageway. This passageway is disposed downstream of the throttle valve 56 but upstream of their respective reed valves 61 and runners. By introducing this lubricant upstream of the reed valve 61, the lubricant will somewhat dampen the sounds created by the reed valve elements 65 and will thus provide for a smoother running engine as well as lubricating the components of the engine not directly lubricated. This includes primarily the piston pins 35. Because the lubricant from this system is introduced to the inlet to the intake manifold 57, it will be distributed equally to each crankcase chamber.

It should be noted that some lubricant may collect in the crankcase chambers 46. This lubricant is drained by means of a passageway 161 formed in the crankcase member 49 at a lower portion thereof. A fitting 162 is connected to each passageway 161 and includes a tube 163 that extends into each intake manifold runner 58 upstream of the reed valve assembly 61 and also at a point at the top of this runner. Because of the running of the engine, there will be a reduced pressure existent in the end of the tube 163 and this will tend to draw lubricant from the crankcase chambers 46. If desired, the fitting 162 may also include a check valve so that lubricant can flow only from the crankcase chambers 46 to the manifold runners 58.

Figure 11:
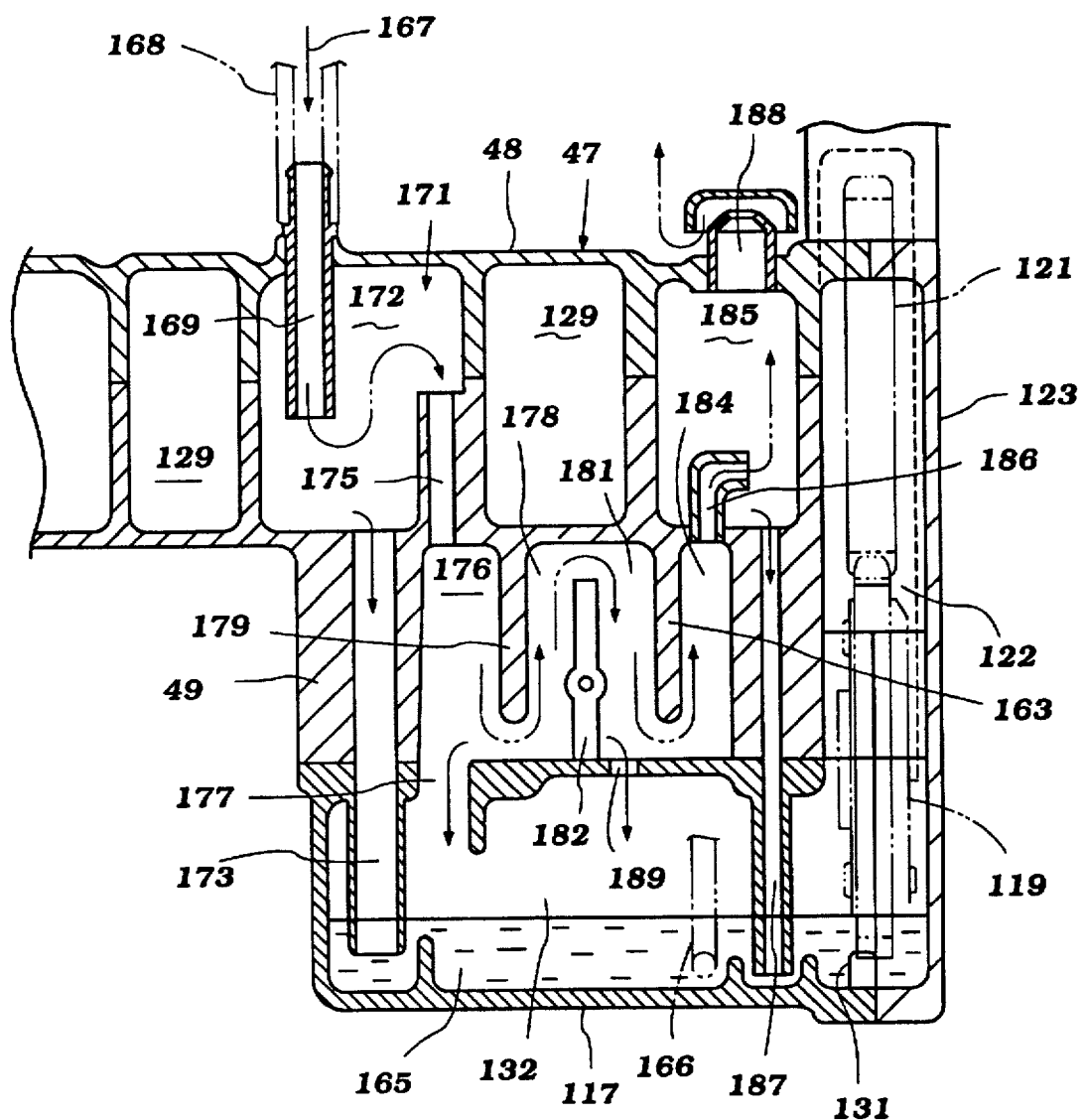
FIG. 11 is a cross-sectional view taken along the line 11—11 of FIG. 10 and shows the oil separating arrangement for the vacuum pump lubrication system.

Referring now primarily to FIG. 11, the lubricant in the transmission cavity 122 and specifically that contained to the side of the wall 129 indicated by the reference numeral 132 actually extends back along a side of the crankcase 47 beneath the forwardmost intake passage 59 so as to contain an adequate volume of lubricant. This lubricant is utilized also to lubricate a vacuum pump for operating certain accessories of the vehicle (to be described later by reference to FIGS. 18–25) and to separate the lubricant from the air which is then discharged to the atmosphere by this vacuum pump.

Oil is supplied from the chamber 132, the lubricant being indicated by the level line 165, through a delivery conduit 166 in the direction of the arrow 167 in FIG. 10. After being circulated this lubricant will become mixed with the air pumped by the vacuum pump and will be returned as shown by the arrow 167 in FIG. 11 through a conduit shown in phantom in this Figure and indicated by the reference numeral 168. This conduit 168 slips over an inlet tube 169 which discharges into the oil separator, indicated generally by the reference numeral 171 and specifically a first chamber 172 thereof which is formed in the side of the crankcase portion 48. A first passageway 173 will accept oil condensing in the chamber 172 and return it to the chamber 132 below the lubricant level 165.

An air passage 175 extends from the chamber 172 above the lubricant passage 173 to a further chamber 176 formed below the chamber 172 and which communicates with the lubricant chamber 132 through a large drain passageway 177. A further chamber 178 is separated from the chamber 176 by a partial wall 179 so as to provide a labyrinth type air flow through the separator 171 and into a further chamber 181 which is separated from the chamber 178 by another partial wall 182. A yet further wall 183, which is also a partial wall, provides restrictive communication between the chamber 181 and a further expansion chamber 184. The chamber 184 communicates with a chamber 185 formed in the side of the crankcase 48 through a short angled tube 186. The chamber 185 has a further drain passage 187 formed below the pipe 186 and which will also return lubricant to the chamber 132 below the level 165 therein. The chamber 185 then discharges the air pumped by the vacuum pump and which has had substantially all of the lubricant separated from it by the separator 171 to the atmosphere through a baffled discharged 188.

The chambers 178, 181 and 184 can drain back to the chamber 132 through a further drain passage 189.

The Vehicle (FIGS. 18–25)

The engine 31 as thus far described may be utilized for any of a multitude of purposes. However, the engine 31 is particularly adapted by powering a motor vehicle and its components and auxiliaries (both as already described and which will be now described) are laid out to facilitate such application. A motor vehicle of the type which may be powered by the engine 31 is depicted in phantom in portions of FIGS. 18–25 and is identified generally by the reference numeral 191. The vehicle 191 is provided with a frame and body assembly 192 having a pair of front wheels 193 suspended therefrom by a suitable suspension system and which front wheels 193 may be steered by any known type of steering mechanism. At the rear end of the vehicle 191, the body frame assembly 192 suspends a pair of rear wheels 194. Again, any suitable type of suspension system may be provided for suspending these rear wheels.

The motor vehicle 191 is of the type that employs a transverse engine placement and drive of the front wheels 193. To this end, the engine 31 is mounted in the frame assembly at the front of the vehicle 191 by engine mounts 195 and 196. The engine 31 is positioned in an engine compartment at the front of the vehicle and which is accessible through a hood 197 (FIG. 19) in a known manner. The transverse positioning of the engine means that its crankshaft 39 rotates about an axis disposed transversely to the longitudinal center line of the vehicle 191.

A transmission 198 is coupled to the engine crankshaft 39 and is driven thereby through a clutch which is associated with a flywheel 199 (FIG. 1) positioned at one end of the transmission housing, indicated by the reference numeral 201 in FIG. 1. This transmission drives the front wheels 193 through any known type of transfer drive and differential assembly.

As has been noted, the induction system for the engine which was described previously draws air from within the engine compartment. This air induction system includes a plenum chamber 201 that is connected to the conduit 54 that extends to the throttle body 55 through an air flow sensor 200. The plenum chamber 201 includes an air filter of any type. The plenum chamber receives ram inlet air from an inlet tube 202 that extends forwardly toward the grill opening at the front of the vehicle body 192.

Figure 19:
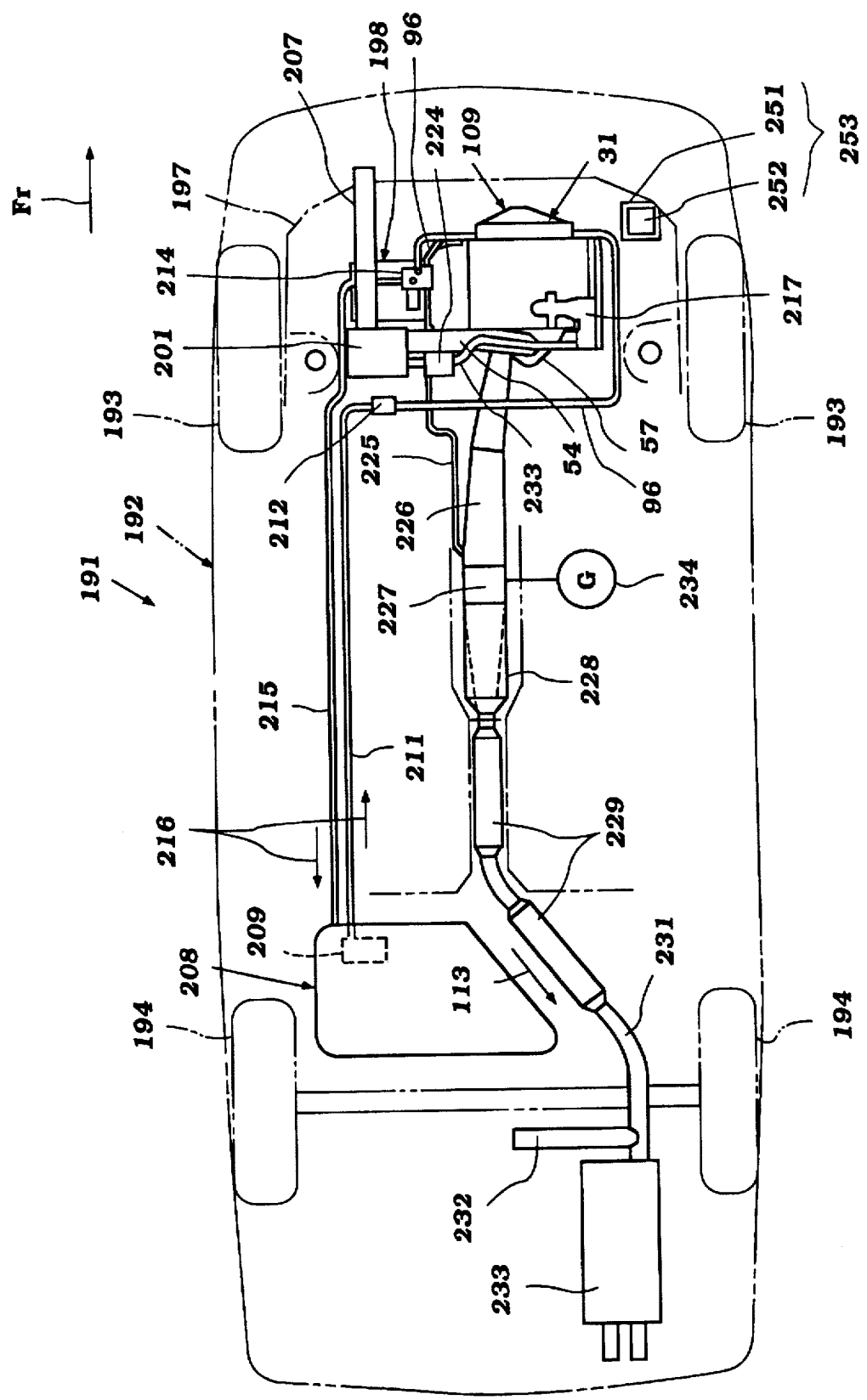
FIG. 19 is a bottom plan view of the installation shown in FIG. 18, with the motor vehicle also shown in phantom.
Figure 20:
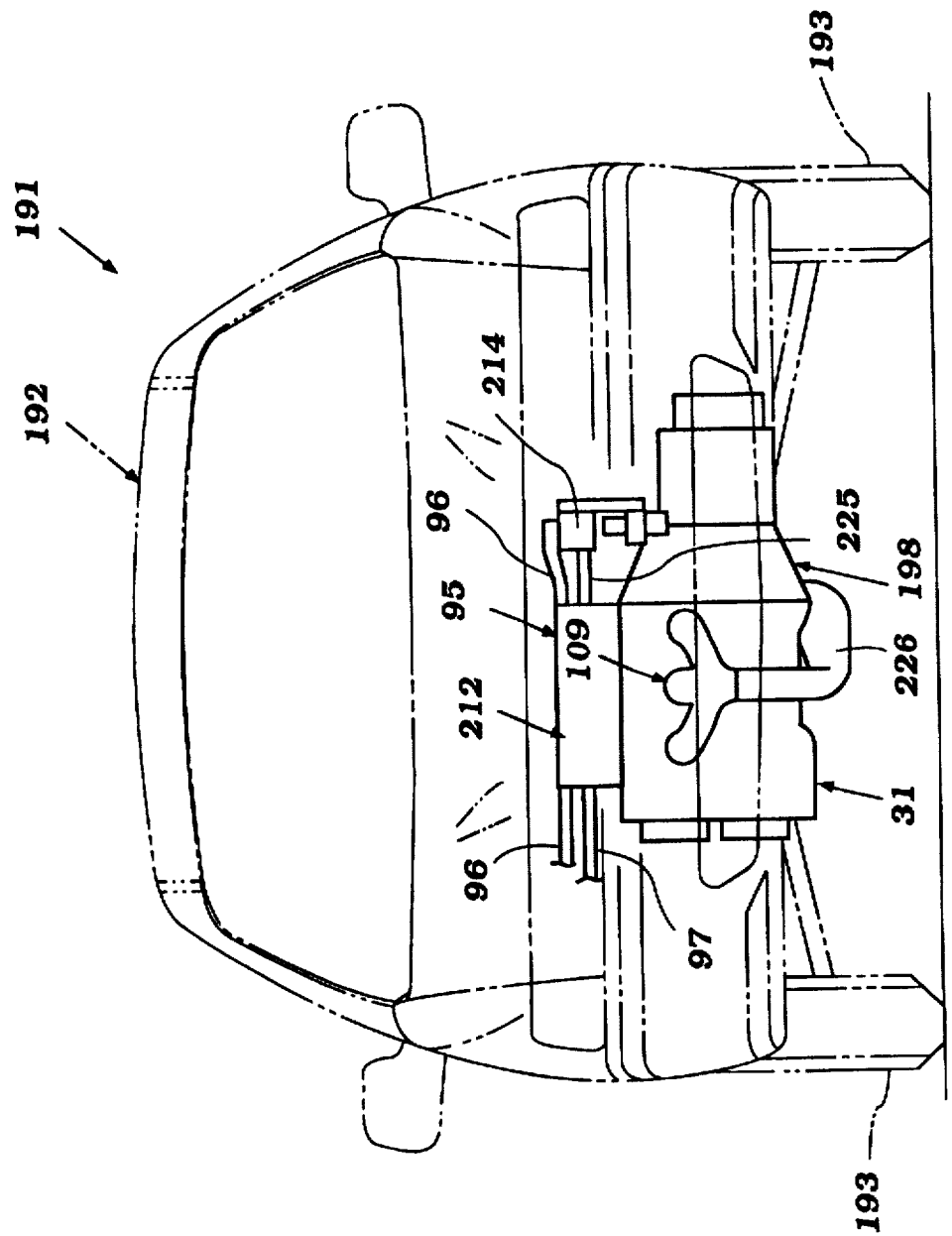
FIG. 20 is a front elevational view of the vehicle and engine, again showing the vehicle in phantom.
Figure 21:
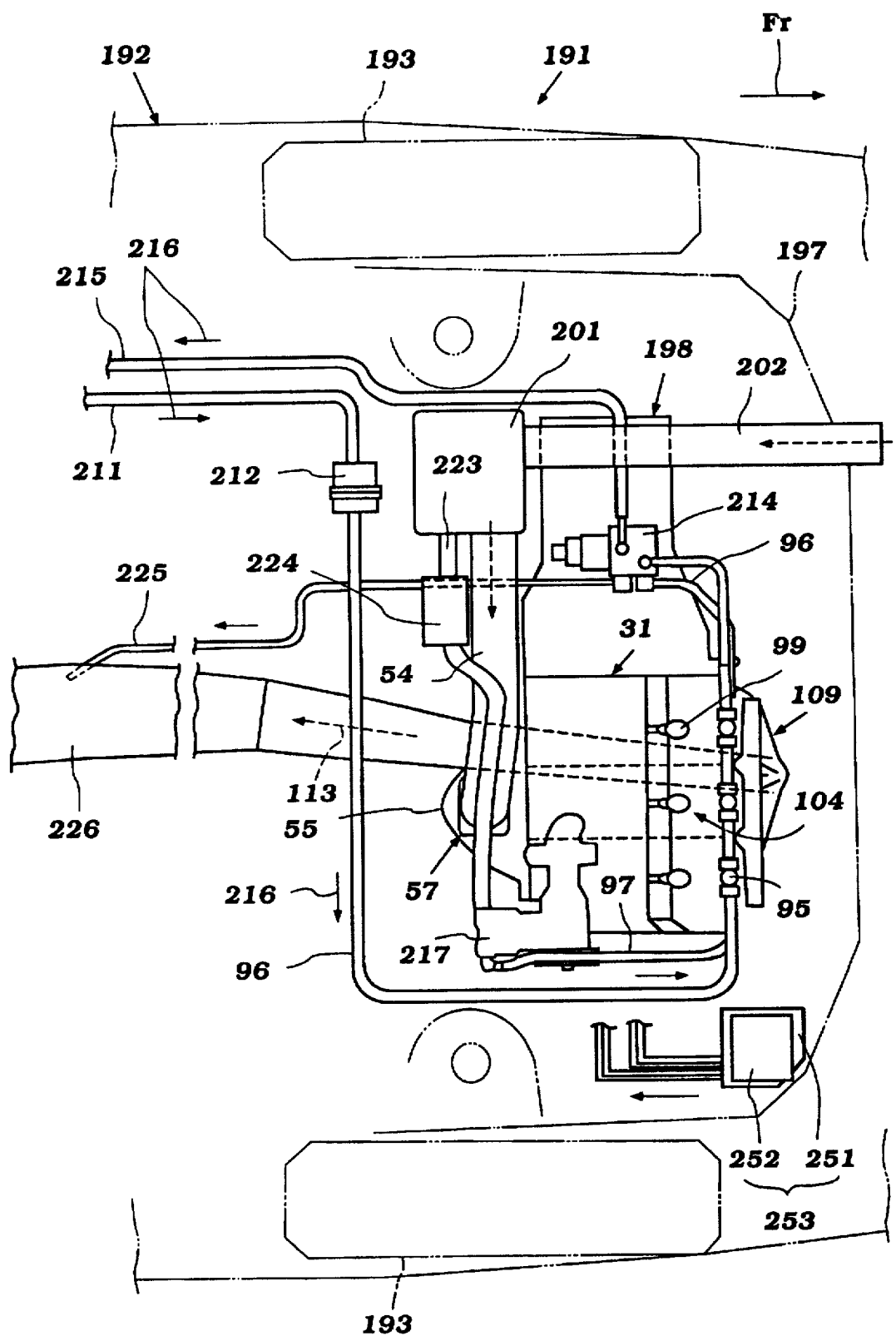
FIG. 21 is an enlarged top plan view of the forward portion of the vehicle, again showing the vehicle in phantom and the engine and its axillaries in solid lines.

It has been noted that the fuel injectors 95 inject fuel into the combustion chambers of the engine and the system for supplying fuel to the fuel injectors 95 will be described by primary reference to FIGS. 19–21. The vehicle body 192 is provided with a rearwardly positioned fuel tank 208 having an in the tank fuel pump 209 that delivers fuel through a conduit 211 to a fuel filter 212. The fuel filter 212 then delivers fuel to the aforenoted fuel conduit 96 which forms a portion of the fuel/air injection system and which includes a common fuel/air manifold and distributor rail, indicated generally by the reference numeral 212 that is connected in a known manner to the fuel/air injectors 95. This conduit 96 also communicates with a pressure regulator 214 that regulates the pressure at which the fuel is supplied to the fuel/air injectors by dumping excess fuel back to the fuel tank 208 through a return conduit 215. The direction of fuel flow through the system is identified by the arrows 216 in these figures.

The air supply system for supplying pressurized air to the air/fuel injectors 95 and specifically to the manifold 212 will now be described by particular reference to FIGS. 19, 21, and 22. As has been noted in the description of the engine, this includes an air supply conduit 97 that receives compressed air from an air compressor 217 that is mounted at the end of the engine opposite the transmission 198 and which is driven from the engine crankshaft by a serpentine drive belt 218. The crankshaft has a pulley 219 that is affixed to it in a known manner and which drives the drive belt 218. This drive belt 218 passes over a belt tensioner 222 and drives additional accessories as will be noted. The air compressor 217 draws the air from the plenum chamber 201 through a conduit 223 that includes a silencing chamber 224.

The air/fuel manifold 212 and specifically the air conduit 96 also communicates with the pressure regulator 214 that maintains a predetermined pressure differential between the regulated fuel pressure and the regulated air pressure (the fuel pressure being higher). The air pressure is regulated by dumping excess air from the regulator 214 into the exhaust system, to be described, through a conduit 225.

Figure 18:
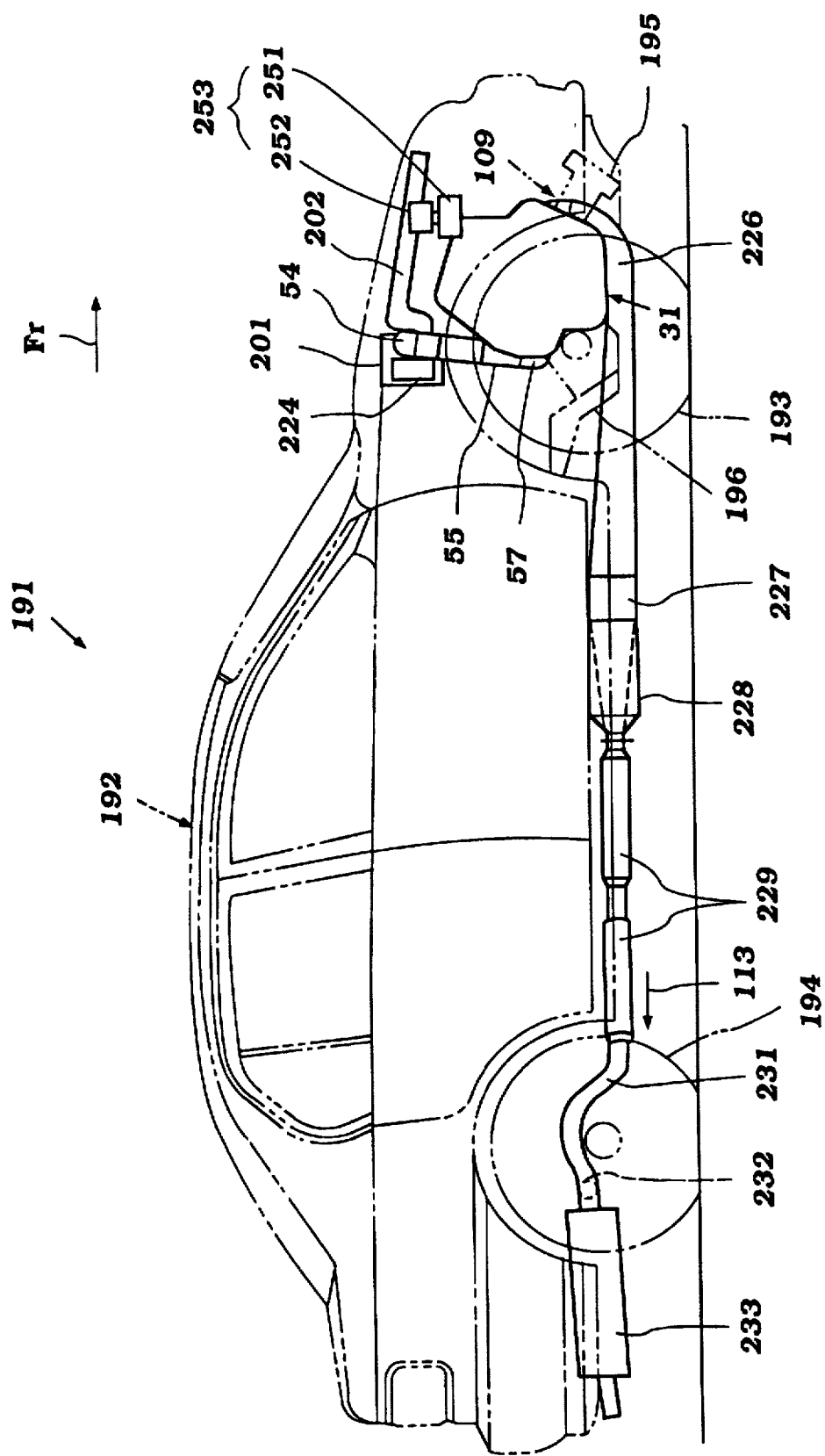
FIG. 18 is a side elevational view of the engine of FIGS. 1–17 and its supporting axillaries as installed in a motor vehicle, which vehicle is shown in phantom.

The remainder of the exhaust system for the engine 31 will now be described by reference to FIGS. 18 and 19. This exhaust system, as previously noted, included the exhaust manifold 109. The exhaust manifold discharges into an exhaust pipe 226 which extends from the front of the engine 31 and runs beneath it to a catalytic converter 227. The catalytic converter 227 is formed as the forward portion of a first muffler 228. The first muffler 228 discharges to a pair of mufflers 229 which, in turn, discharge to a tail pipe 231. A branch pipe 232 intersects the tail pipe 231 where the tail pipe 231 discharges into a final muffler 233 that then delivers the exhaust gases to the atmosphere.

A temperature probe extends in to the catalyst 228 and provides a signal to a gage 234 that is positioned in the operator's compartment of the vehicle.

The Cooling System (FIGS. 5,12 and 23–28)

As has been noted, the engine 31 is liquid cooled and the cooling jackets 133 and 134 for the engine were described in the portion of this specification dealing with the engine. However, it was noted that the manner in which the coolant was circulated through the engine would be described and that description will now be made by particular reference back to FIGS. 5 and 12 and to FIGS. 23–28. The engine is provided with a combined water pump, thermostat assembly 235 which is driven by the engine in an known manner and which circulates coolant through a discharge line 236 to a heat exchanger or radiator 237. The coolant then returns to the water pump, thermostat assembly 235 through a return line 238. Coolant is delivered to the engine through a coolant supply line 239 and into the engine cylinder block 32 through a fitting 241 (FIGS. 5, 12, 24, and 26), with the direction of the coolant flow to the engine being identified by the reference numeral 242.

Figure 5:
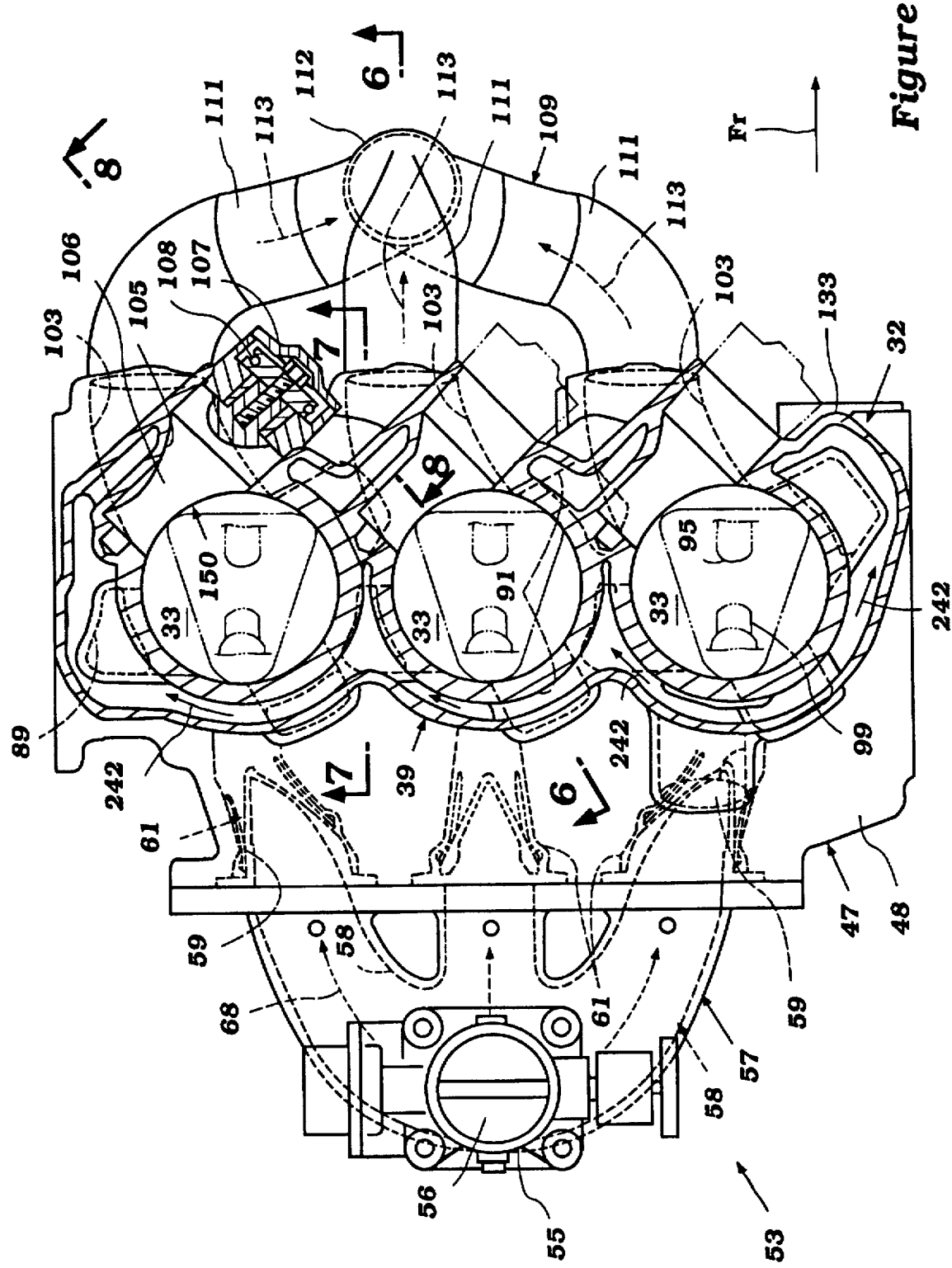
FIG. 5 is a cross-sectional view taken along the line 5—5 of FIG. 2.
Figure 6:
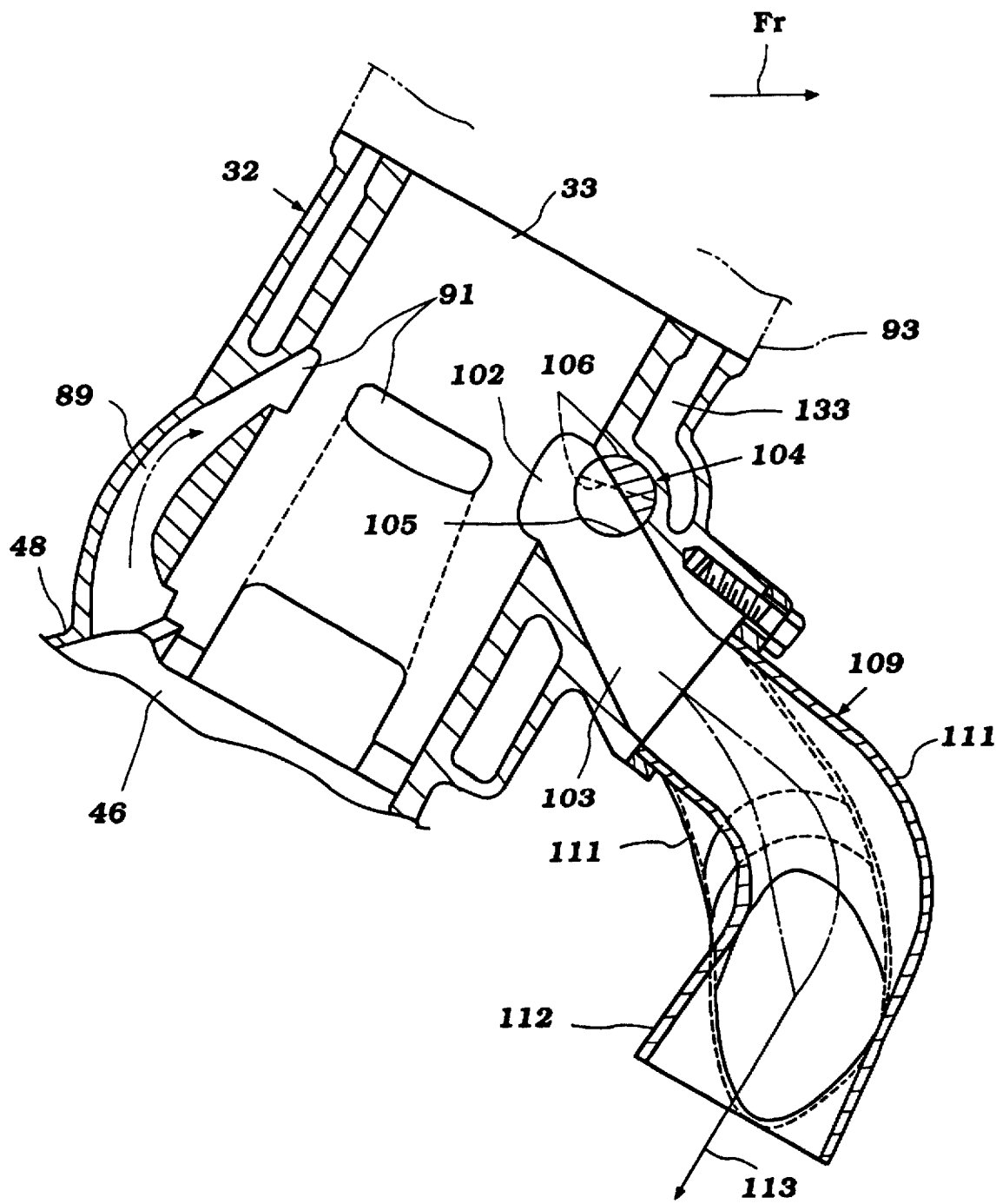
FIG. 6 is a cross-sectional view taken along the line 6—6 of FIG. 5.
Figure 7:
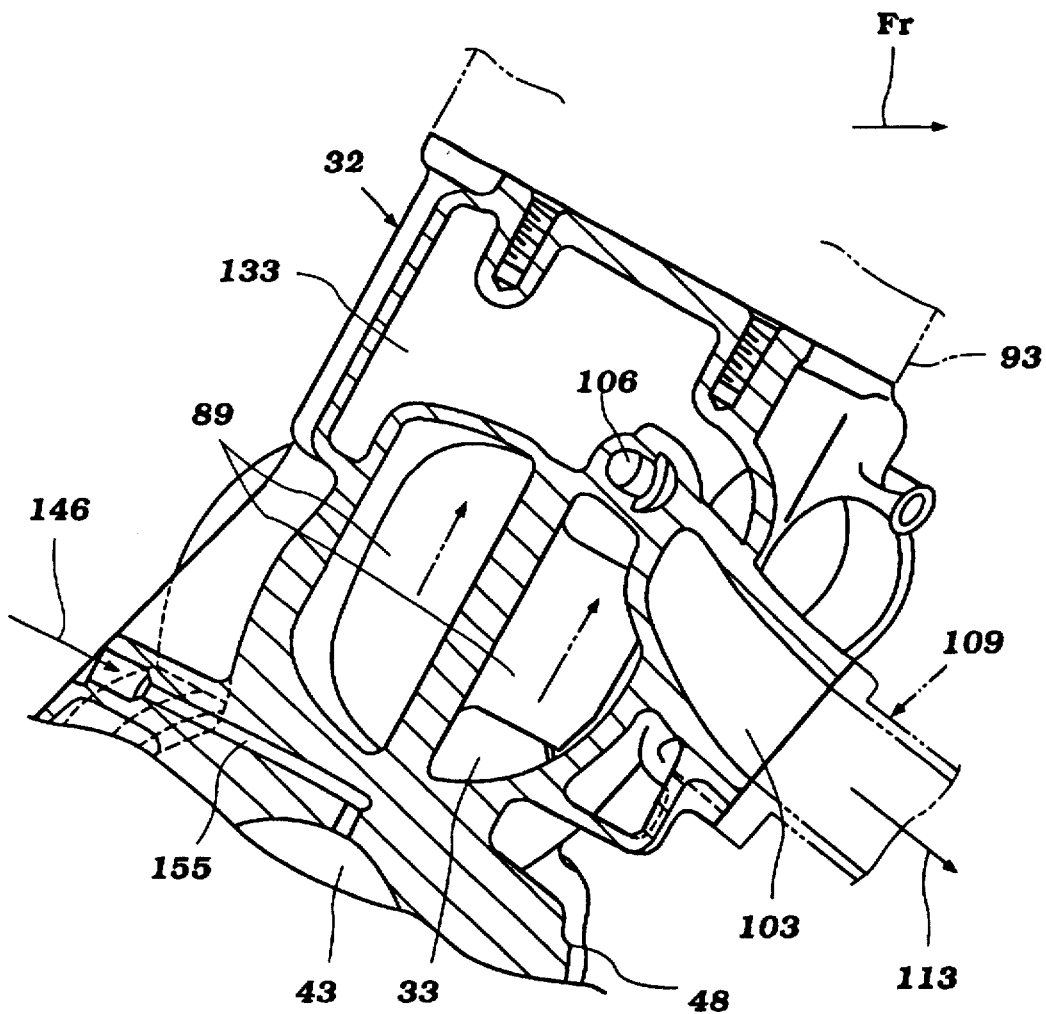
FIG. 7 is a cross-sectional view taken along the line 7—7 of FIG. 5.
Figure 28:
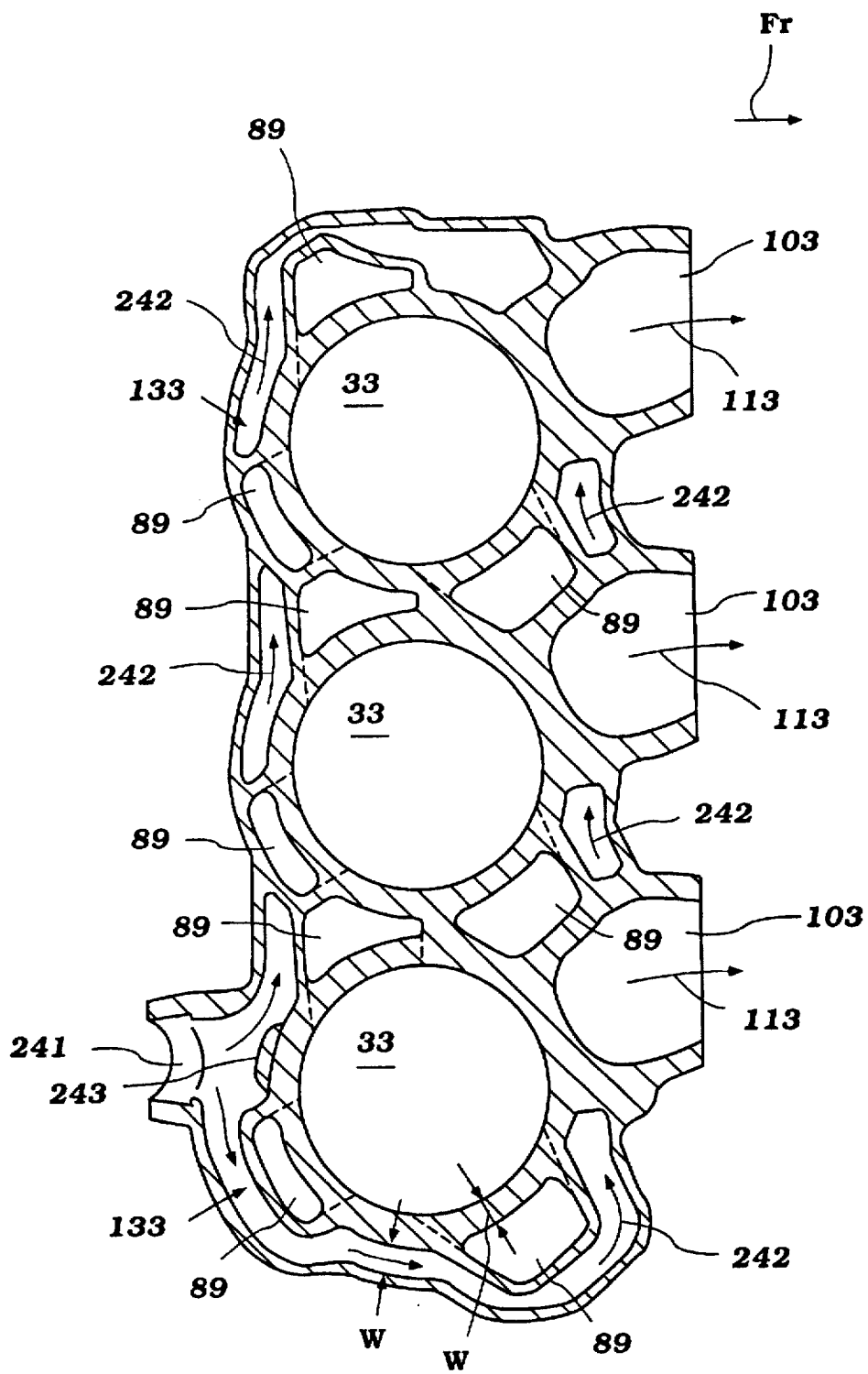
FIG. 28 is a cross-sectional view of the cylinder block taken through the center of the cooling jacket water inlet opening.

As may be seen, particularly in FIGS. 5, 12, and 26–28, the water inlet fitting 241 of the cylinder block 32 is disposed adjacent the endmost cylinder bore 33. In addition, the inlet fitting 241 is disposed so that water flowing into the cylinder block cooling jacket 133 will be directed against the outer surface of the endmost cylinder bore 33. Since the cooling water entering the cooling jacket 133 is at a relatively low temperature, there is a risk that there may be excessive quenching on the cylinder wall adjacent the water inlet opening 241. To avoid this excess quenching and to ensure good water distribution around the complete periphery of the end cylinder bore 33, there is provided a protuberance 243 on the portion of the cylinder block adjacent the opening 241. This protuberance will provide a greater wall thickness than the normal wall thickness W of the cylinder blocks surrounding the individual cylinder bores 33, and thus inhibit somewhat the cooling in this area. Also, as shown in FIGS. 5, 12, and 28, the protuberance 243 will also cause the water flow coming in the inlet 241 to be directed in both directions around the cylinder bore 33 at the end of the engine.

It should be noted that the thickness of the water jacket, indicated also by the dimension W, is substantially equal to the thickness of the material of the cylinder block 32 extending around the cylinder bores 33.

The reduction in the likelihood of quenching due to the proximity to the water inlet opening 241 provided by the protuberance 243 is also helpful in ensuring that if the cylinder bores 33 are plated, as with a thin film plating, as may be preferred, that the plating will not tend to flake off because of the possibility of high thermal gradients across the cylinder wall thickness W.

As may be seen by the arrows 242 in FIGS. 5, 12, and 28, the coolant that has entered the cylinder block cooling jacket 133 will flow from one end to the other and surround each of the cylinder bores 33. This coolant is then discharged upwardly through circumferentially extending discharge ports 244 that are formed in the upper sealing face 245 of the cylinder block 32. The ports 244, in addition to permitting the coolant to flow from the cylinder block cooling jacket 133, are also used so as to discharge the sand from the core when the cylinder block 32 is cast. Thus, it is desirable to maintain the ports 244 of a relatively large size.

The ports 244 communicate with corresponding ports formed in the lower surface of the cylinder head casting 93. However, since the ports 244 around each cylinder bore 33 have the same effective area, there is a risk that the cylinder bore 33 where the water inlet opening 241 is formed will receive more cooling water than the remaining cylinders. As the cylinder bores 33 are spaced further from the water inlet opening 241, they are likely to receive less coolant, and hence there may be uneven coolant temperature along the length of the cylinder block 32, with those cylinders adjacent the inlet 241 being operated at a lower temperature and being better cooled than those at the remote end.

To avoid this risk, a cylinder head gasket, indicated generally by the reference numeral 246, is affixed between the cylinder block 32 and the cylinder head 93. Such sealing gaskets 246 are normally employed and generally will have the same size water flow openings as those openings 244 of the cylinder block 32 and the corresponding openings of the cylinder head 93. However, in order to ensure more equal cooling of all cylinder bores 33, there are provided a first series of openings 247 which have a smaller effective cross-sectional area than the openings 244 of the cylinder block 32 adjacent the cylinder bore 33 where the water inlet 241 is disposed.

A next, somewhat larger series of openings 248 are formed around the adjacent cylinder bore 33. Finally, openings 249 are formed around the most remote cylinder bore 33 (cylinder no. 3 in this embodiment), and these openings 249 may be the same size as the openings 244 in the cylinder block. As a result, the flow of coolant around the cylinder bores 33 will be more uniform.

It should be noted that the radial dimension of the openings 244 in the deck 245 of the cylinder block 32 have approximately the same dimension as the width W of the cylinder block cooling jacket 133.

Coolant is discharged from the cylinder head 93 by the conduit 236, which has been shown schematically in the figures and which is disposed at the end of the cylinder head 93 opposite to the cylinder block water inlet opening 241.

It has been previously noted that there is a lubricating system for certain components of the engine, such as a direct lubricating system that supplies lubricant through the passages 150 directly to the cylinder bores, a system that supplies lubricant to the cylinder block galleries 159, and an indirect lubricating system that supplies lubricant to the engine through its induction system. This lubricating system includes a lubricant reservoir 251 (FIGS. 18, 19, 21, and 22) where lubricant is drawn from this reservoir through one or more lubricant pumps 252, as described in the aforenoted copending application incorporated herein by reference, and supplied to the engine 31 in the manner described in this application and disclosure which has been incorporated from the copending application. This lubricating system is indicated generally by the reference numeral 253 in these figures.

Figure 22:
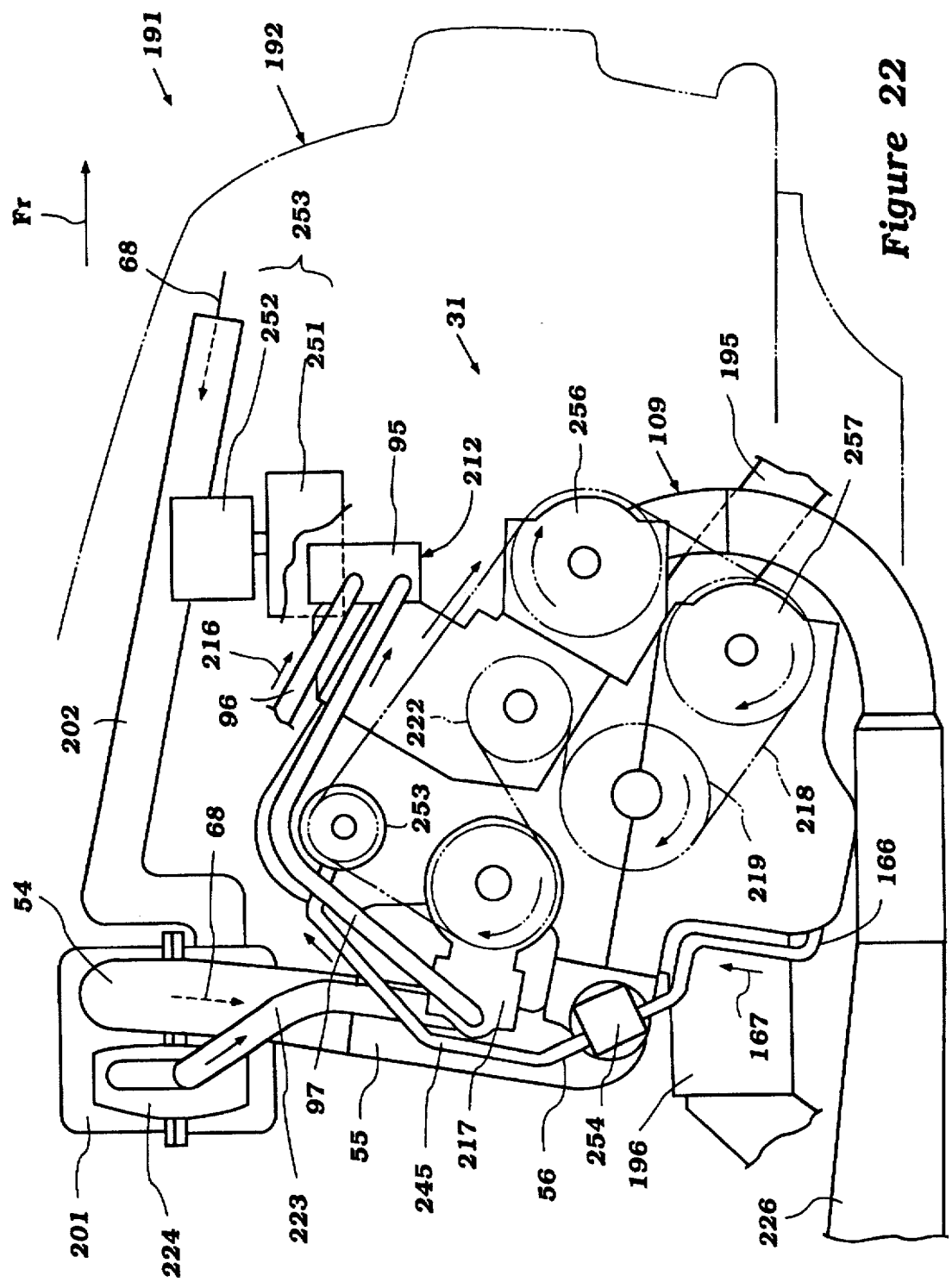
FIG. 22 is an enlarged side view of the front of the vehicle looking in the same direction as FIG. 18.
Figure 23:
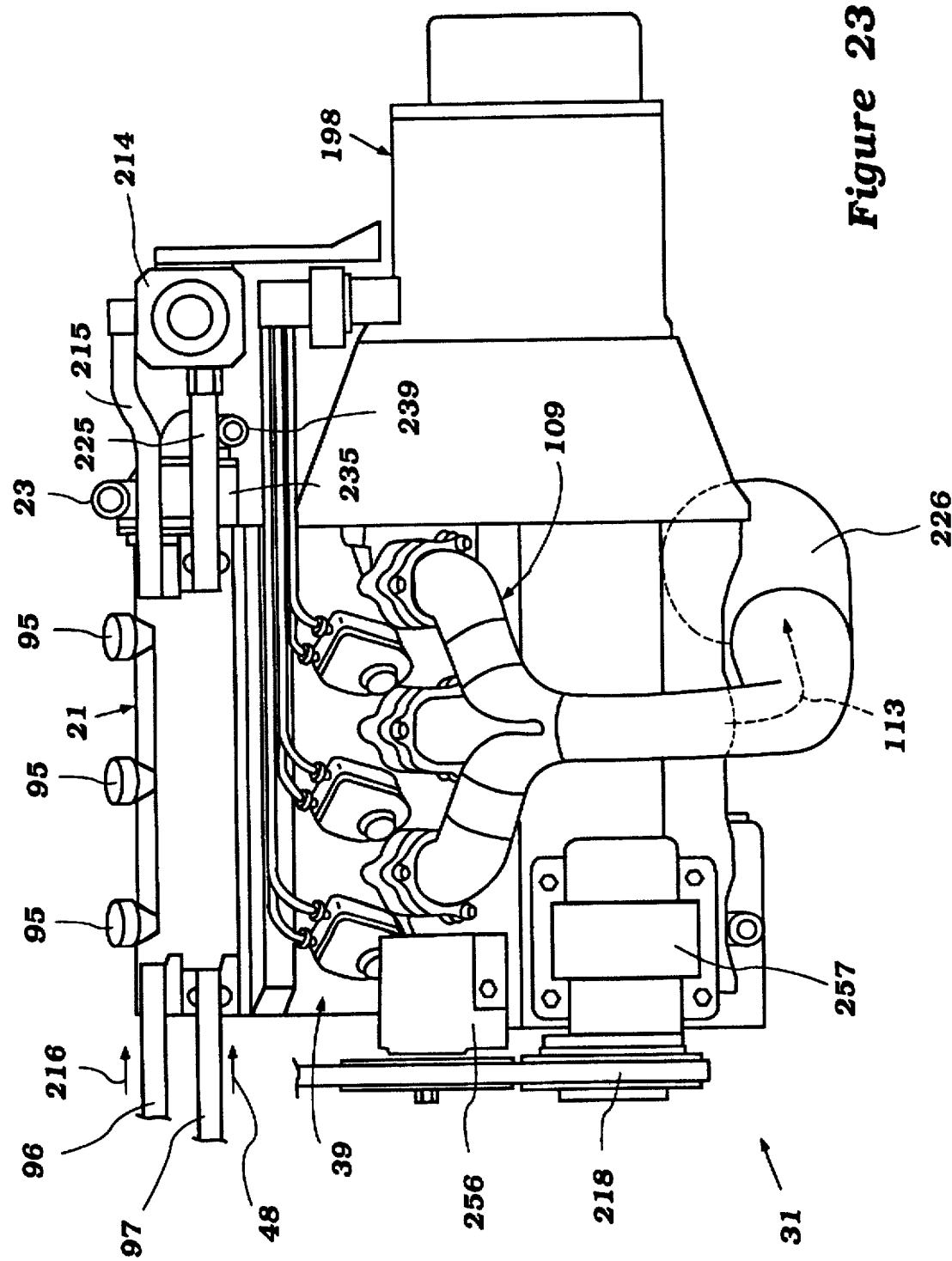
FIG. 23 is an enlarged front elevational view of the engine and the accessories which are visible from the front of the vehicle.
Figure 24:
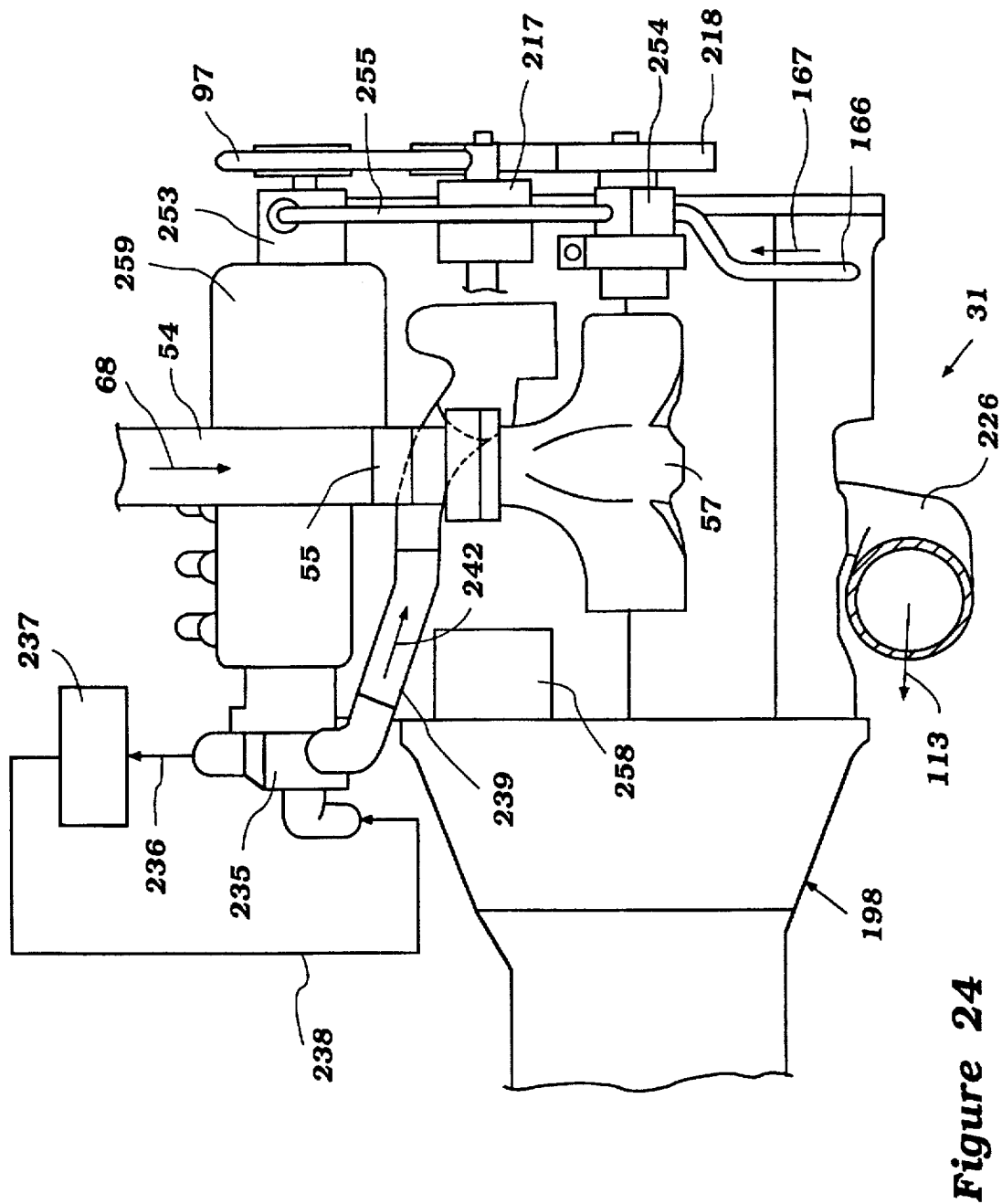
FIG. 24 is a rear elevational view of the engine and its supporting accessories.
Figure 25:
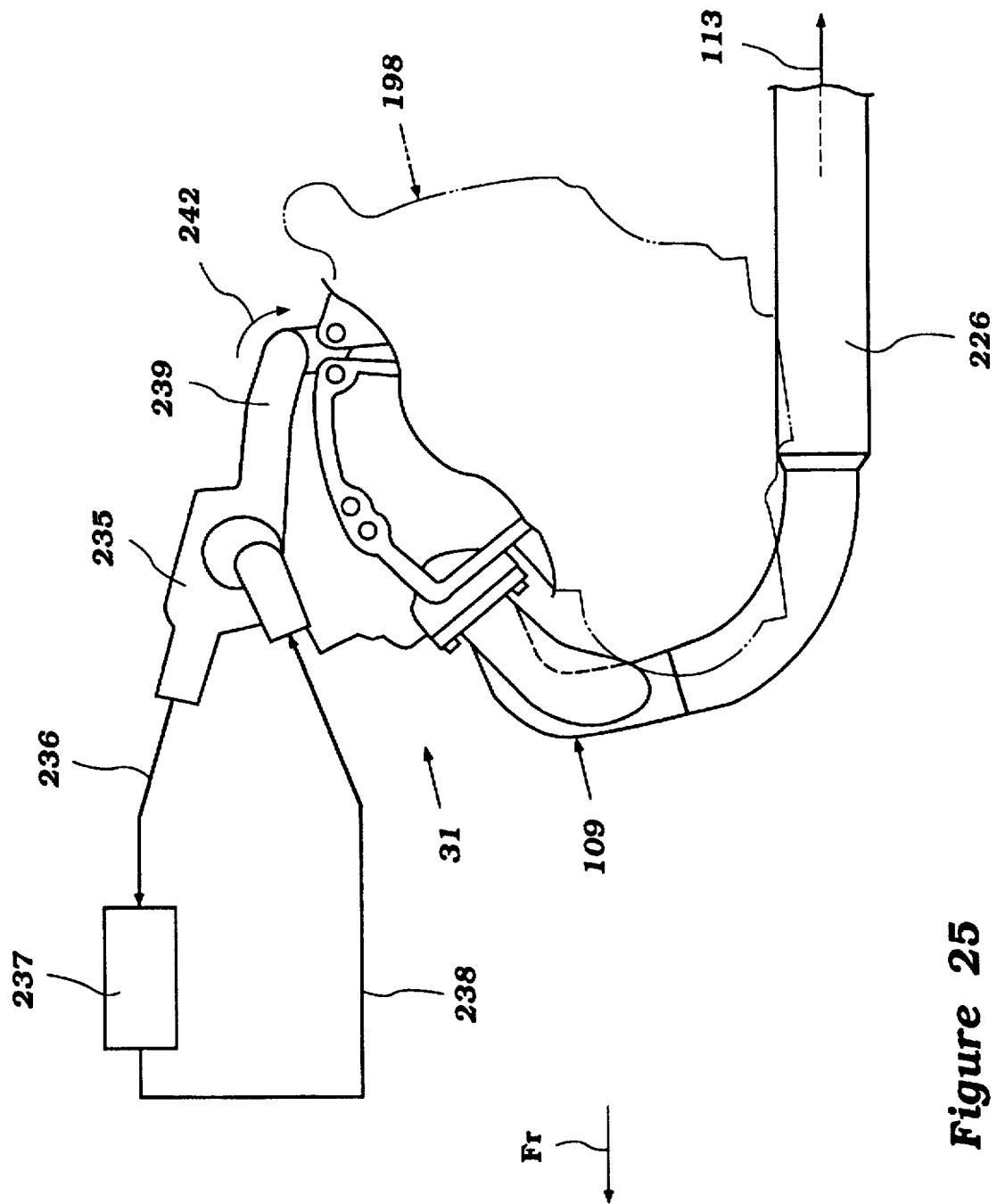
FIG. 25 is a side elevational view of the engine with certain components being broken away and other components being shown schematically and looking in the direction opposite to FIG. 17.
Figure 26:
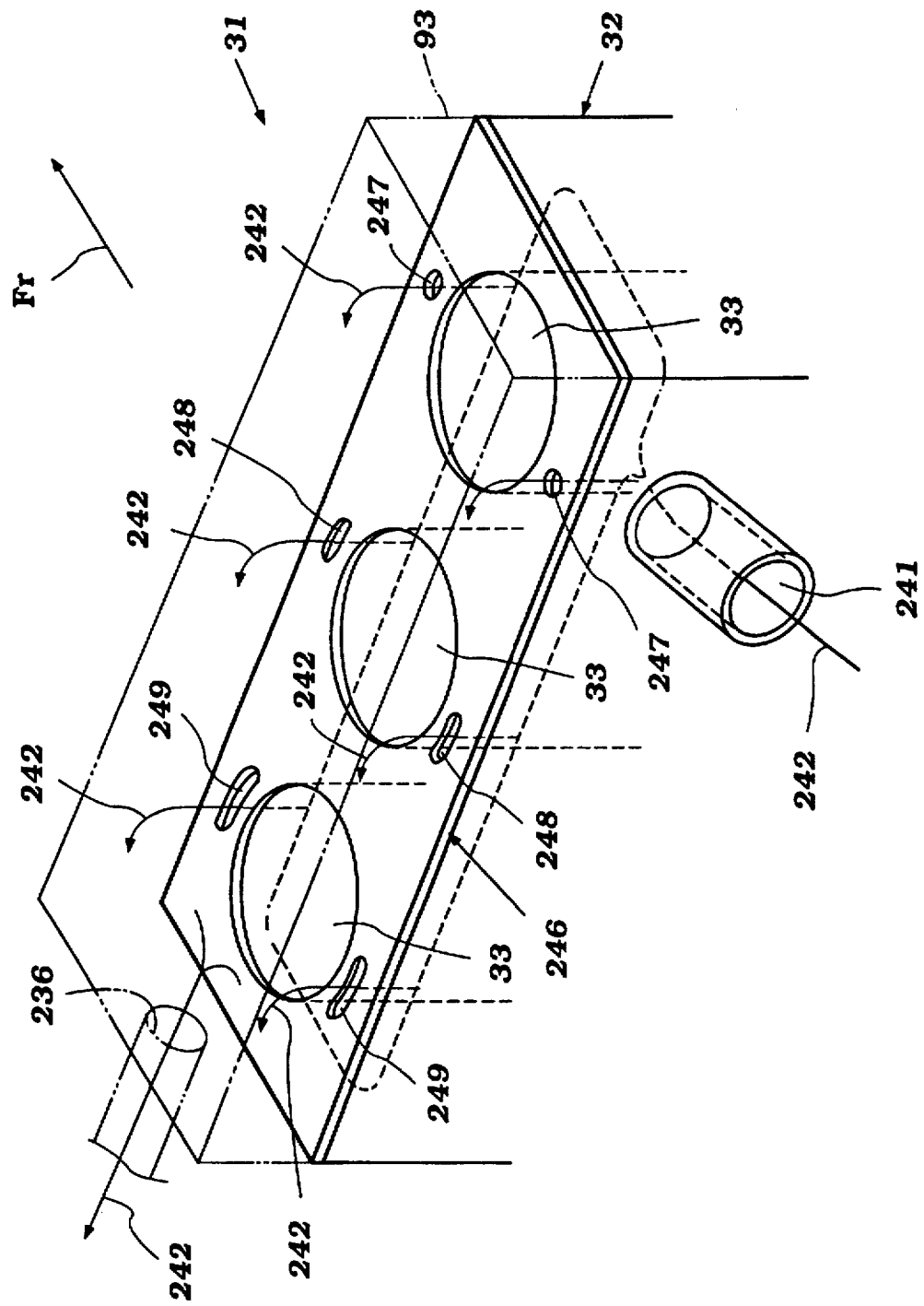
FIG. 26 is a perspective view looking from the front and one side of the engine, showing the cooling system with the cylinder head being shown in block form and in phantom line view, the cylinder block being shown in block form and the cylinder head gasket being shown in solid line view showing the water flow through the cooling jacket from the cylinder block through the cylinder head gasket to the cylinder head and out of the cylinder head.
Figure 27:
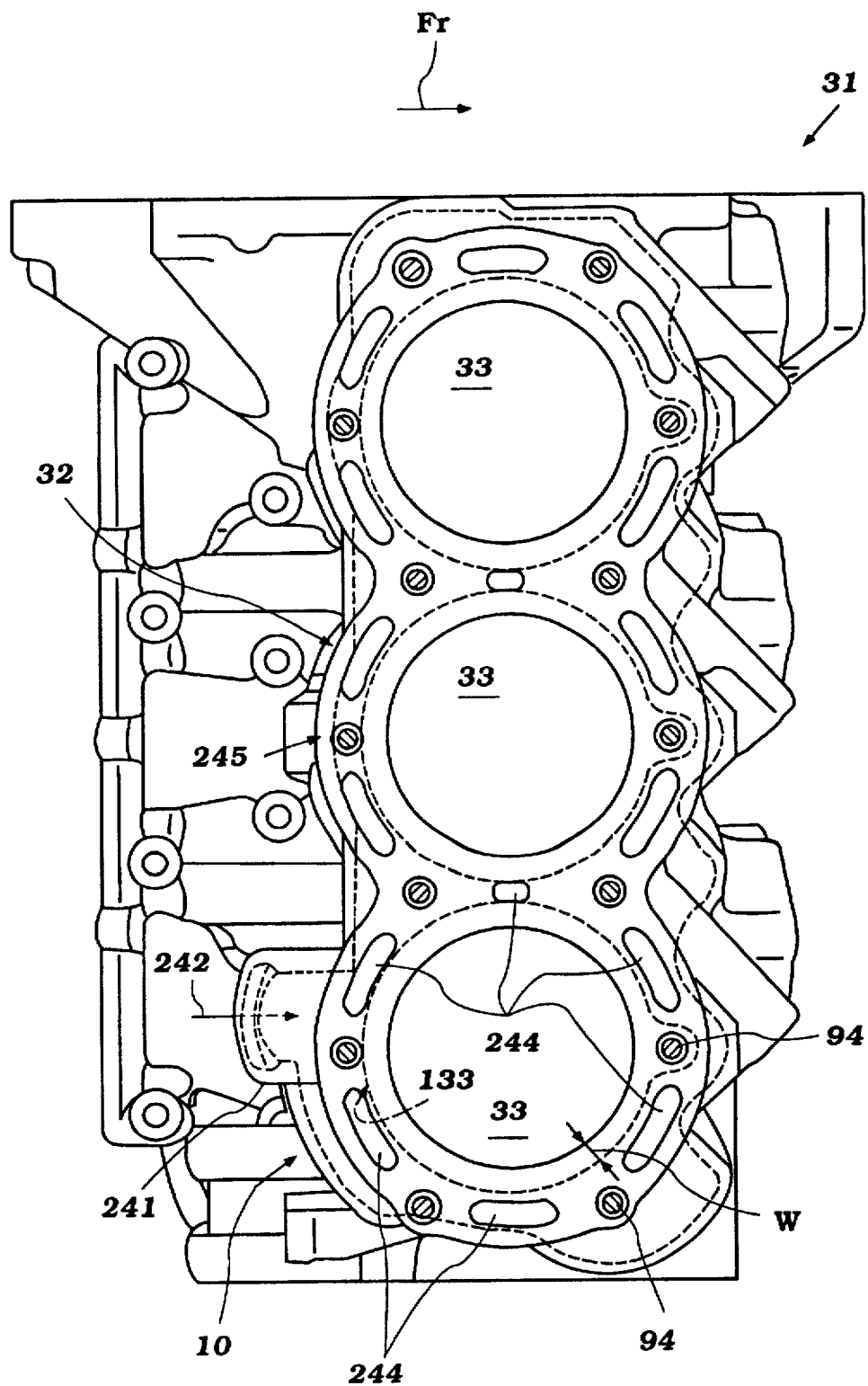
FIG. 27 is a top plan view of the cylinder block with the pistons, cylinder head, and cylinder head gasket removed.

Continuing to refer to FIGS. 18–25 and as has been previously noted, a vacuum pump is driven from the engine and this vacuum pump and the components associated with it may be best understood by reference to FIGS. 22 and 24. The vacuum pump is indicated generally by the reference numeral 253 and is driven by the drive belt 218. The vacuum pump 253 provides a source of vacuum for the power braking system of the vehicle inasmuch as the engine 31 does not itself provide adequate induction system vacuum for the brake booster. The air is drawn from the brake booster by the vacuum pump 253 and is discharged to the atmosphere through the oil separator 171 previously described in conjunction with the description of the engine and illustrated in FIG. 11.

As has been noted, the vacuum pump 253 is lubricated from the lubricant in the sump 165 of the transmission 118. As has been previously noted, this lubricant is drawn through the conduit 166 and is drawn by an oil pump 254 which is driven from the engine through a suitable belt or other drive (not shown). The oil pump 254 then delivers the oil to the vacuum pump 253 through a pressure line 255.

The air which is pumped from the brake booster by the vacuum pump 255 is returned through the aforenoted conduit 168 (FIG. 11) to the oil separator 171 as previously described and then discharged to the atmosphere through the outlet 188.

Two remaining accessories are driven from the drive belt 218 and these appear in certain of these figures and are provided for operating other components of the vehicle. These components appear also in FIG. 22 and comprise a power steering pump 256 and an air conditioning compressor 257.

The vehicle and specifically the engine 31 is also provided with an electric starter 258 (FIG. 24) of any type which cooperates with the flywheel 199 in a known manner for engine starting.

Finally, the electrical system also includes a alternator or generator 259 that is driven off the rear of the vacuum pump 253 from the drive belt 218 for charging the battery of the vehicle and providing other electrical power.

It should be readily apparent from the foregoing description that the described construction, and specifically that of the piston, piston rings, and cylinder in association with the orientation of the fuel injector, ensure against piston ring sticking, overheating of the small end of the connecting rod, and scuffing and wear of the cylinder bore, piston rings, and piston head. Of course, the foregoing description is that of preferred embodiments of the invention, and various changes and modifications may be made without departing from the spirit and scope of the invention as defined by the appended claims.

We claim:

1. An internal combustion engine comprising a cylinder defining a cylinder bore, a piston reciprocating in said cylinder bore and formed with at least one ring groove, a piston ring received in said ring groove and defining a gap at its adjacent ends, means for fixing said piston ring in said ring groove of said piston for limiting the relative rotation therebetween, and a fuel injector for spraying fuel into said cylinder bore in a direction toward said piston ring gap.

2. An internal combustion engine as in claim 1, wherein the piston is provided with a plurality of ring grooves and piston rings, and at least one of the piston rings is fixed against rotation.

3. An internal combustion engine as in claim 2, wherein the uppermost piston ring is held against rotation.

4. An internal combustion engine as in claim 3, wherein all of the piston rings are held against rotation.

5. An internal combustion engine as in claim 4, wherein the piston rings are held against rotation in such a way so that their respective gaps are circumferentially spaced from each other.

6. An internal combustion engine as in claim 5, wherein all of the piston rings are held so that their respective gaps are in the path of fuel spray from the fuel injector.

7. An internal combustion engine as in claim 1, wherein the engine is a crankcase compression, two-cycle engine and wherein there is provided at least one port in the wall of the cylinder bore, the piston ring being retained against rotation in an orientation so that its gap is not disposed in circumferential alignment with the port and will not pass across the port during the reciprocation of the piston.

8. An internal combustion engine as in claim 7, wherein the piston is provided with a plurality of ring grooves and piston rings, and at least one of the piston rings is fixed against rotation.

9. An internal combustion engine as in claim 8, wherein the uppermost piston ring is held against rotation.

10. An internal combustion engine as in claim 9, wherein all of the piston rings are held against rotation.

11. An internal combustion engine as in claim 10, wherein the piston rings are held against rotation in such a way so that their respective gaps are circumferentially spaced from each other and none of the gaps are circumferentially aligned with the port.

12. An internal combustion engine as in claim 11, wherein all of the piston rings are held so that their respective gaps are in the path of fuel spray from the fuel injector.

13. An internal combustion engine as in claim 1, wherein the cylinder bore is closed by a cylinder head assembly, and a fuel injector is disposed in the cylinder head assembly.

14. An internal combustion engine as in claim 13, wherein the fuel injector is disposed on one side of the cylinder bore and is directed toward the other side of the cylinder bore, the piston ring gap being retained on the other side of the cylinder bore.

15. An internal combustion engine as in claim 1, wherein the piston is comprised of a head portion in which the ring groove is formed, a skirt portion below said head portion for slidably engaging the associated cylinder bore, and a piston pin boss formed below said head portion and at least in part inwardly of said skirt portion for connection by a piston pin to the small end of a connecting rod, at least said head portion being surface treated for increasing its hardness and for reducing its heat conductivity for protecting the piston pin from excessive heat.

16. An internal combustion engine as in claim 15, wherein the surface treatment extends at least in part through the piston ring groove.

17. An internal combustion engine as in claim 15, wherein the surface treatment is also performed on the interior surface of the piston.

18. An internal combustion engine as in claim 17, wherein the surface treatment is also provided in the piston pin boss in a bore therein that receives the piston pin.

19. An internal combustion engine as in claim 18, wherein the piston is formed from aluminum, and the surface treatment is a hardening and lubricating alumide treatment.

20. An internal combustion engine as in claim 1, wherein the piston is provided with a roughened surface adjacent the ring groove for trapping and retaining lubricant.

21. An internal combustion engine as in claim 20, wherein the roughened surface is formed on the head portion of the piston around the ring groove.

22. An internal combustion engine as in claim 21, wherein the roughened surface is formed below the ring groove.

23. An internal combustion engine as in claim 20, wherein the roughen surface is performed on a portion of the ring groove.

24. An internal combustion engine as in claim 23, wherein the roughened surface is performed on the lower surface of the ring groove.

* * * * *